United States Patent
Matsumoto

(10) Patent No.: US 8,296,603 B2
(45) Date of Patent: Oct. 23, 2012

(54) LOAD TEST METHOD AND LOAD TEST APPARATUS

(75) Inventor: Noboru Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 12/206,943

(22) Filed: Sep. 9, 2008

(65) Prior Publication Data

US 2009/0077421 A1  Mar. 19, 2009

(30) Foreign Application Priority Data

Sep. 14, 2007 (JP) .................................. 2007-240083

(51) Int. Cl.
*G06F 11/00* (2006.01)
(52) U.S. Cl. ............. 714/10; 714/11; 702/182; 702/186
(58) Field of Classification Search .................. 714/10, 714/11; 702/182, 186; 700/108
See application file for complete search history.

(56) References Cited

U.S. PATENT DOCUMENTS

| | | | |
|---|---|---|---|
| 5,504,670 A * | 4/1996 | Barth et al. | 700/5 |
| 5,740,353 A * | 4/1998 | Kreulen et al. | 714/42 |
| 5,864,660 A * | 1/1999 | Hamameh et al. | 714/32 |
| 6,002,868 A * | 12/1999 | Jenkins et al. | 717/105 |
| 6,029,257 A * | 2/2000 | Palmer | 714/40 |
| 6,691,253 B1 * | 2/2004 | Gillenwater et al. | 714/36 |
| 6,871,298 B1 * | 3/2005 | Cavanaugh et al. | 714/33 |
| 6,889,157 B2 * | 5/2005 | Mutchler et al. | 702/119 |
| 7,383,168 B2 * | 6/2008 | Mukherjee et al. | 703/22 |
| 7,558,642 B2 * | 7/2009 | Bagwell et al. | 700/108 |
| 7,752,499 B2 * | 7/2010 | Choudhury et al. | 714/25 |
| 2005/0193258 A1 | 9/2005 | Sutton | |

FOREIGN PATENT DOCUMENTS

| | | |
|---|---|---|
| JP | 9-160842 | 6/1997 |
| JP | 2001-75833 | 3/2001 |
| JP | 2004-13866 | 1/2004 |
| JP | 2004-21524 | 1/2004 |
| JP | 2005-182813 | 7/2005 |
| JP | 2007-26235 | 2/2007 |

OTHER PUBLICATIONS

Japanese Office Action for Application No. 2007-240083 issued Jun. 26, 2012.

* cited by examiner

*Primary Examiner* — Philip Guyton
(74) *Attorney, Agent, or Firm* — Staas & Halsey LLP

(57) ABSTRACT

A load test method for a computer and apparatus are provided. The method includes acquiring control information indicating a type of a hardware resources required for executing a load test program and quantitative conditions determined for each type of the hardware resources, acquiring an assignment rule table specifying a set of rules for each of the various hardware resources to assign the hardware resources of the computer to a load test program, selecting a rule for each of the hardware resources from the acquired assignment rule table in such a manner that a load is imposed on a predetermined part of the computer, developing the load test programs by assigning the hardware resources of the computer to the load test programs based on the acquired control information and the selected rule for each of the various hardware resources, and executing in parallel the developed load test programs.

13 Claims, 22 Drawing Sheets

FIG. 4

| CPU ASSIGNMENT RULE | | | | | |
|---|---|---|---|---|---|
| NORMAL (ASCENDING ORDER) | NORMAL (DESCENDING ORDER) | ACCORDION | ONE THREAD FROM WITHIN ONE CHIP | SB DISTRIBUTION (ASCENDING ORDER) | ... |
| MEMORY ASSIGNMENT RULE | | | | | |
| NORMAL (ASCENDING ORDER) | NORMAL (DESCENDING ORDER) | CONCENTRATED ON SPECIFIED SB | SB DISTRIBUTION (ASCENDING ORDER) | SB DISTRIBUTION (DESCENDING ORDER) | ... |
| EXTERNAL UNIT ASSIGNMENT RULE | | | | | |
| NORMAL (ASCENDING ORDER) | NORMAL (DESCENDING ORDER) | CONCENTRATED ON SPECIFIED SB | SB DISTRIBUTION (ASCENDING ORDER) | SB DISTRIBUTION (DESCENDING ORDER) | ... |

FIG. 5

| HARDWARE RESOURCE TYPE INFORMATION | QUANTITATIVE CONDITION |
|---|---|
| CPU | FOUR UNITS WITHOUT SPECIFIC LIMITATION |
| MEMORY | 384 MB |
| EXTERNAL UNIT | TWO UNITS |

FIG. 15

| ID | CPU ASSIGNMENT RULE | MEMORY ASSIGNMENT RULE | EXTERNAL UNIT ASSIGNMENT RULE | COMMENT |
|---|---|---|---|---|
| 1 | SB DISTRIBUTION (ASCENDING ORDER) | SB DISTRIBUTION (ASCENDING ORDER) | SB DISTRIBUTION (ASCENDING ORDER) | CPU CHIP LOAD |
| 2 | CONTINUOUS (ASCENDING ORDER) | CONCENTRATED ON SPECIFIED SB | CONCENTRATED ON SPECIFIED SB | LOAD ON SPECIFIED SB |
| 3 | CONTINUOUS (ASCENDING ORDER) | SB DISTRIBUTION (DESCENDING ORDER) | CONTINUOUS (ASCENDING ORDER) | SYSTEM BUS LOAD |
| 4 | ONE THREAD FROM WITHIN ONE CHIP | SB DISTRIBUTION (ASCENDING ORDER) | SB DISTRIBUTION (ASCENDING ORDER) | CACHE LOAD |
| 5 | ACCORDION | SB DISTRIBUTION (ASCENDING ORDER) | SB DISTRIBUTION (ASCENDING ORDER) | DATA TRANSFER PATH LOAD |
| ... | ... | ... | ... | ... |

FIG. 17

| SMALL SCALE TEST PROGRAM ID | CONTROL INFORMATION |
|---|---|
| A | C1 |
| B | C2 |
| C | C3 |
| D | C4 |

FIG. 18

| SMALL SCALE TEST PROGRAM ID | SMALL SCALE TEST PROGRAM ENTITY |
|---|---|
| A | PG1 |
| B | PG2 |
| C | PG3 |
| D | PG4 |

LOAD TEST METHOD AND LOAD TEST APPARATUS

CROSS-REFERENCE TO RELATED APPLICATIONS

This application is related to and claims priority to Japanese Patent Application No. 2007-240083, filed on Sep. 14, 2007, and incorporated herein by reference.

BACKGROUND

1. Field

The embodiments discussed herein are directed to a load test method and a load test apparatus for a computer.

2. Description of the Related Art

In recent years, a CPU chip referred to as a hyper threading CPU chip, having plural processor cores therein operating as plural pseudo CPUs (central processing units) has been developed.

A large scale computer system is available in which system boards each having plural hyper threading CPU chips are interconnected through a dedicated bus. The large scale computer system, before coming to find the practical application, is required to go through the design stage in which the structure of the hardware resources making up the large scale computer system is expressed by a predetermined method (for example, using drawings) to test whether the conceptual large scale computer system operates in a logically correct fashion as expected. In addition, the large scale computer system built through the design stage is tested to see whether it operates in the same logically correct fashion as the test result shows, and then subjected to a load test to see whether it can stand the protracted use.

In the stage of the load test, the large scale computer system executes an exclusive load test program to check not only the logical matching previously conducted on each part but also the logical matching in the operation of the large scale computer system as a whole and the durability against the long-term operation.

A conventional use of the load test program in the load test stage is a computer test method using a single multiprocessor system.

SUMMARY

It is an aspect of the embodiments discussed herein to provide a load test method for a computer that includes acquiring control information indicating the type of a hardware resources required for executing a predetermined load test program and quantitative conditions determined for each type of the hardware resources, acquiring an assignment rule table specifying a set of rules for each of the various hardware resources to assign the hardware resources of the computer to a predetermined load test program, selecting a rule for each of the hardware resources from the acquired assignment rule table in such a manner that a load is imposed on a predetermined part of the computer, developing the predetermined plurality of the load test programs by assigning the hardware resources of the computer to the predetermined load test programs based on the acquired control information and the selected rule for each of the various hardware resources, and executing in parallel the plurality of the developed load test programs.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 illustrates exemplary information stored in an assignment rule table holding unit;

FIG. 5 illustrates exemplary information stored in a control information holding unit;

FIG. 15 illustrates exemplary information stored in an assignment rule set holding unit;

FIG. 17 illustrates exemplary information stored in a control information holding unit;

FIG. 18 illustrates exemplary information held in a small scale test program holding unit;

DETAILED DESCRIPTION OF THE EMBODIMENTS

A load test conducted on a large scale computer system according to an exemplary embodiment is disclosed.

Figure 1:
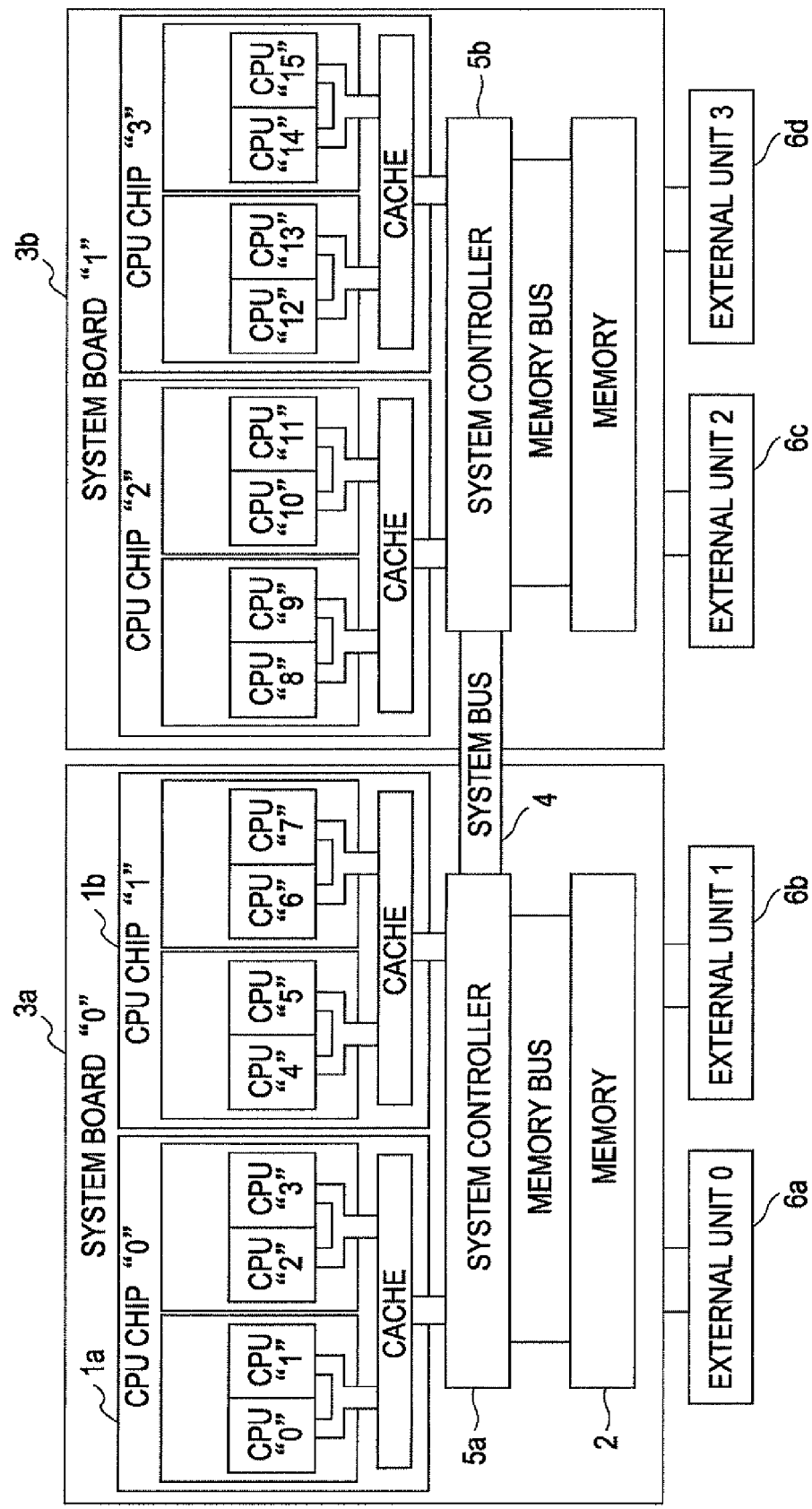
FIG. 1 illustrates a large scale computer system.

With reference to FIG. 1, a large scale computer system on which a load test program is executed according to an embodiment will be explained. FIG. 1 illustrates the large scale computer system.

As illustrated in FIG. 1, the large scale computer system according to this embodiment includes a system board 3a having the basic component elements of the computer hardware such as CPU chips 1a to 1b and a memory 2 and the other system board 3b having a similar configuration to the system board 3a connected to each other through a dedicated system bus 4. The system boards 3a, 3b are connected to each other by system controllers 5a, 5b for controlling the system boards 3a, 3b as a whole.

Also, the system boards 3a, 3b each have a multiprocessor configuration including plural CPU chips, two CPU chips according to this embodiment. The system board 3a, for example, includes a CPU chip 1a and a CPU chip 1b. Further, each CPU chip has plural integrated processor cores, two processor cores according to this embodiment, and each processor core has mounted thereon a hyper threading function operating as two pseudo CPUs. For example, the CPU chip 1a includes two processor cores CPU "0" and CPU "1".

Also, the system boards 3a, 3b are connected with external units 6a to 6d such as an input unit, an output unit and an external storage unit.

Further, in the large scale computer system, predetermined ranks are defined for the CPU chips, the processor cores, the pseudo CPUs based on the hyper threading and the external units. As to the CPU chips, for example, the CPU chip "0" is highest in rank, followed downward by the CPU chip "1", the CPU chip "2" and the CPU chip "3" which is lowest in rank.

Next, with reference to FIG. 2, execution of the load test program for the large scale computer system described above will be explained.

First, the structure of the load test program will be explained. The load test program has a small scale test program assigned a few hardware resources as compared with the hardware configuration of the large scale computer system. In the large scale computer system explained in FIG. 1, though having 16 pseudo processor cores based on the hyper threading, the load test program has a small scale test program assigned four processor cores, for example, required for execution of the particular small scale test program.

Also, each small scale test program includes the control information indicating the type of the hardware resources required for execution of the small scale test program and the quantitative condition determined for each type of the hardware resources. As a specific example, the small scale test program has the control information indicating that four processor cores, four memories and four external units and two memories of 384 MB are required at the time of execution thereof.

Figure 2A:
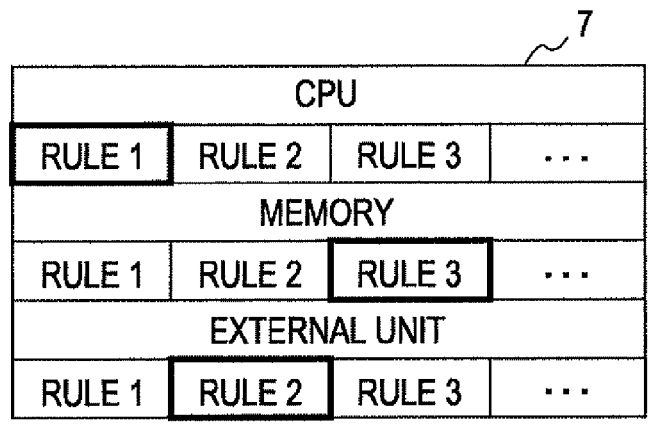
FIGS. 2A and 2B illustrate an exemplary load test program executed.

As illustrated in FIG. 2A, the large scale computer system holds an assignment rule table 7 in a predetermined storage unit in the system by execution of the load test program. The assignment rule table 7 is a table for storing the rule for assigning the various hardware resources of the large scale computer system to the small scale test programs described above.

In the rule prevailing for assignment to the pseudo CPUs based on the hyper threading of the large scale computer system described in FIG. 1, for example, the CPU "0" highest in rank, the CPU "1" and the CPU "2" may be assigned in that order in ascending order according to predefined ranks (normal [ascending order]). The assignment rule table 7 includes various other assignment rules. Each rule will be explained in detail later.

Returning to FIG. 2A, the large scale computer system selects a rule for each hardware resource from the assignment rule table 7 in such a manner as to impose a load on a predetermined part of the large scale computer system. For example, the large scale computer system selects the rule 1, the rule 3 and the rule 2 for the processor core, the memory and the external unit, respectively.

Figure 2B:
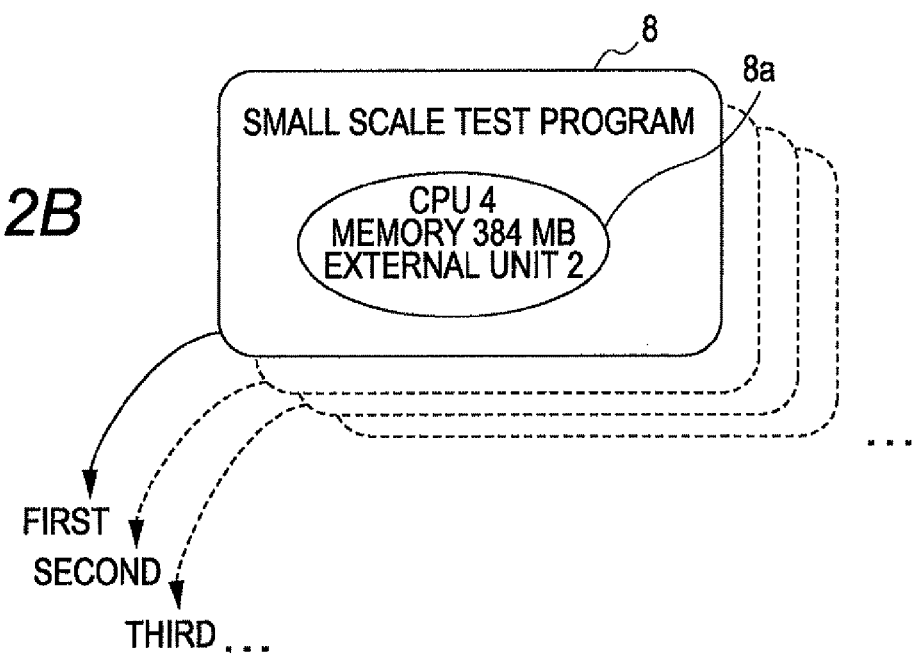

As illustrated in FIG. 2B, the large scale computer system assigns the hardware resources of the system to small scale test programs 8 based on the rule selected for each of the various hardware resources and control information 8a of the small scale test programs 8 included in the load test program.

The hardware resources to be assigned to the small scale test programs 8, as described above, are few as compared with the hardware configuration of the large scale computer system. The remaining hardware resources of the large scale computer system, if any, after being assigned to the small scale test programs, therefore, are further assigned to the small scale test programs 8 thereby to develop the plural small scale test programs 8. The large scale computer system executes the developed small scale test programs in parallel.

As described above, once the load test program is executed, a state can be created in which a heavy load is imposed on a predetermined part of the large scale computer system in accordance with the manner in which the rule is selected.

Figure 3:
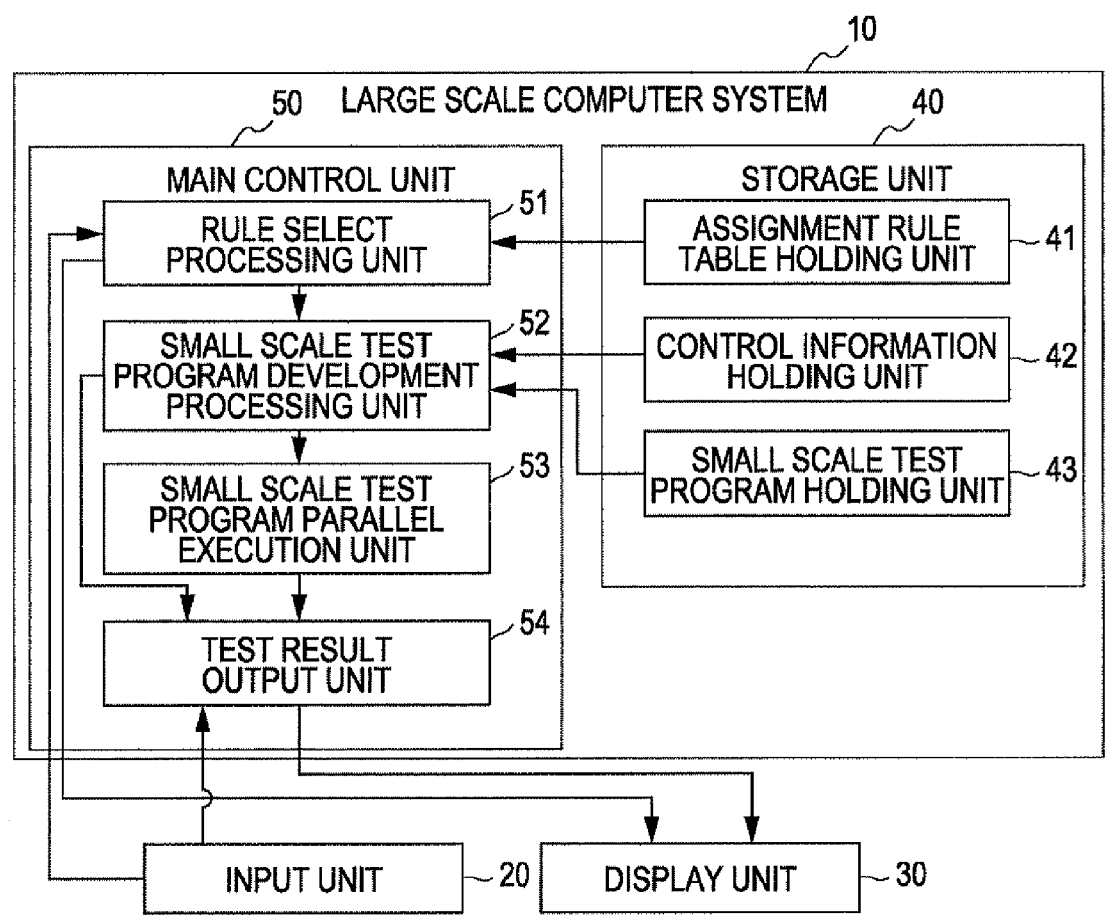
FIG. 3 illustrates a large scale computer system according to an embodiment.

The A configuration of the large scale computer system according to the an embodiment will be explained with reference to FIG. 3. FIG. 3 illustrates a large scale computer system according to an embodiment. As illustrated in FIG. 3, a large scale computer system 10 includes an input unit 20, a display unit 30, a storage unit 40 and a main control unit 50. The configuration of the large scale computer system 10 illustrated in FIG. 3 is a general expression of the large scale computer system illustrated in FIG. 1. The input unit 20, the display unit 30 and the storage unit 40 of the large scale computer system 10 correspond to any ones of the external units 6a to 6d, respectively, of the large scale computer system illustrated in FIG. 1. Also, the main control unit 50 of the large scale computer system 10 corresponds to a general expression of the system boards 3a, 3b as a unit in charge of the control of the large scale computer system of FIG. 1 as a whole.

The input unit 20 receives a predetermined instruction from the operator and inputs a signal indicating the content of the instruction to the main control unit 50. The display unit 30 displays the result of the processing operation executed by each processing unit. The display unit 30 displays a start screen displayed immediately after execution of the load test program, a screen for creating a set of rules and a predetermined screen indicating the test result.

The storage unit 40 has stored therein the load test program. Once the load test program is read from the storage unit 40 and executed by the main control unit 50, an assignment rule table holding unit 41, a control information holding unit 42 and a small scale test program holding unit 43 are generated in the storage unit 40.

The assignment rule table holding unit 41 holds an assignment rule table to store the rule for assigning the hardware resources of the large scale computer system 10 to a predetermined load test program set for each hardware resource. As illustrated in FIG. 4, the assignment rule table holding unit 41 holds the assignment rule table in which the various rules for assigning the hardware resources of the large scale computer system 10 to the small scale test programs are arranged by being classified according to the hardware resource of the large scale computer system 10. According to this embodiment, plural types of rules are set for each hardware resource, and an appropriate one of them is selected in accordance with the test conducted. FIG. 4 illustrates exemplary information stored in the assignment rule table holding unit 41.

The various assignment rules arranged in the assignment rule table illustrated in FIG. 4 will be explained with reference to FIG. 1. The word "normal (ascending order)" of the processor core assignment rule illustrated in FIG. 4 is the rule for assigning the hardware resources, i.e. the CPU processor cores in ascending order based on the ranks defined for the CPUs "0" to "15" of the large scale computer system 10 illustrated in FIG. 1. In an embodiment, the CPU "0", CPU "1" and CPU "2" may be assigned in that order to the small scale test programs according to this rule.

The word "normal (descending order)", on the other hand, is a rule for assigning the hardware resources to the small scale test programs in descending order. In an embodiment, the CPU "15, CPU "14" and CPU "113" may be assigned in that order according to this rule.

Also, the word "accordion" is a rule for assigning the processor cores CPU "0", CPU "15", CPU "1", CPU "14", CPU "2" and CPU "13" in that order to the small scale test programs.

Also, the wording "one thread from within one chip" is a rule for selecting and assigning a single thread processor core from one CPU chip to the small scale test programs. According to this embodiment, this rule is used to assign the threads including the CPU "0" of the CPU chip "0" the CPU "4" of the CPU chip "1", the CPU "8" of the CPU chip "2", the CPU "12" of the CPU chip "3", the CPU "1" of the CPU chip "0", the CPU "5" of the CPU chip "1", the CPU "9" of the CPU chip "2" and the CPU "13" of the CPU chip "3" in that order to the small scale test programs.

Further, the wording "SB (system board) distribution (ascending order)" is a rule under which in the case where four CPUs are required to execute the small scale test program, the hardware resources may be assigned by switching alternately, for example, between the system board "0" including the CPU "0", CPU "1", CPU "2" and CPU "3" and the system board "1" including the CPU "8", CPU "9", CPU "10" and CPU "11".

Also, the wording "concentrated on a specified SB" included in the classification of the memory assignment rule illustrated in FIG. 4 indicates a rule for assigning the hardware resources (memories) mounted on a specified system board to the small scale test programs. According to this rule, only the memory on the system board "0", for example, is assigned to the small scale test programs in the large scale computer system 10 illustrated in FIG. 1. Other memory assignment rules and other external unit assignment rules specify similar manner of assignment to those described above and therefore are not described.

The control information holding unit 42 holds the control information indicating the type of the hardware resources required for execution of the small scale test programs and the quantitative condition for each type of the particular hardware resources. As illustrated in FIG. 5, the control information holding unit 42 stores therein the correspondence between the hardware resource type information indicating the type of the hardware resources and the quantitative conditions indicating the conditions relating to the number and quantity of each hardware resource required for execution of the small scale test programs. As illustrated in FIG. 5, for example, the control information holding unit 42 has stored therein the correspondence between the hardware resource type information "CPU" and the quantitative condition "four without any specific limitation". FIG. 5 illustrates exemplary information stored in the control information holding unit 42.

The small scale test program holding unit 43 holds the small scale test programs. One small scale test program may be held, or plural different small scale test programs may alternatively be held.

The main control unit 50 is for controlling the large scale computer system 10 as a whole and includes therein a rule select processing unit 51, a small scale test program development processing unit 52, a small scale test program parallel execution unit 53 and a test result output unit 54. Once the large scale computer system 10 executes the load test program, the CPU "0" of the large scale computer system 10 illustrated in FIG. 1 acts as a master taking charge of the processing units.

The rule select processing unit 51 selects a rule for each of the various hardware resources from the assignment rule table held in the assignment rule table holding unit 41 in such a manner as to impose a load on a predetermined part of the large scale computer system 10.

Figure 6:
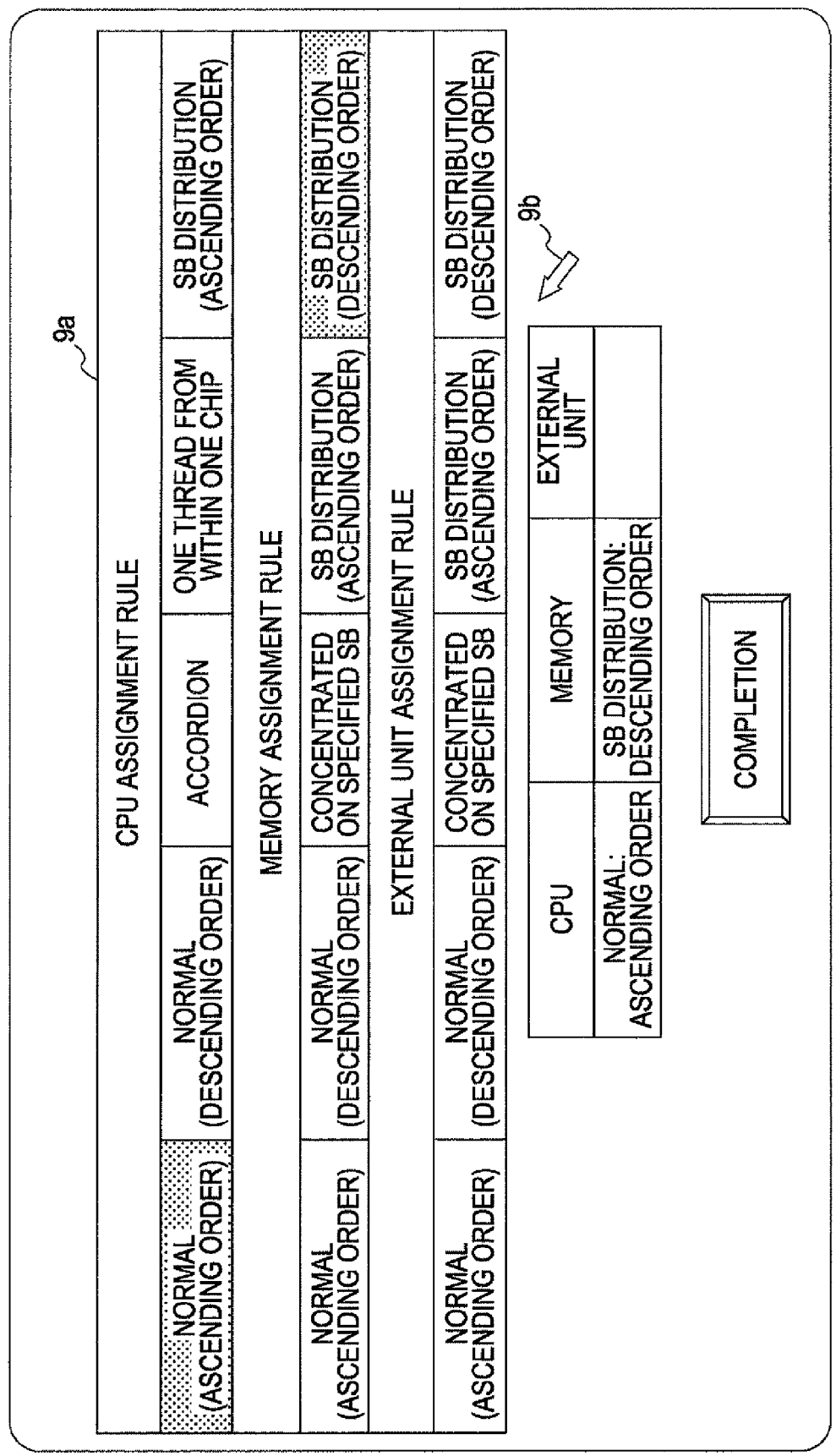
FIG. 6 illustrates exemplary screen displayed on a display unit.

The rule select processing unit 51, upon receipt of a load test program execute instruction accepted by the input unit 20, displays a predetermined screen for accepting the rule select operation on the display unit 30 (see FIG. 6). The rule select processing unit 51, upon receipt of the control signal input by the operator through the input unit 20, selects the rule for each of the various hardware resources from the assignment rule table holding unit 41 based on the control signal thereby to generate a rule set. The rule select processing unit 51 outputs the particular rule set to the small scale test program development processing unit 52.

As illustrated in FIG. 6, for example, the rule select processing unit 51, with the operator designating a section defined on the table 9a in the screen through a pointer 9b, selects a rule corresponding to the designated section of the table 9a from the assignment rule table holding unit 41 thereby to generate a rule set repeatedly. As an example, assume in FIG. 6 that the operator has already selected "normal (ascending order)" as a CPU assignment rule and "SB distribution (descending order)" as a memory assignment rule. On the screen of FIG. 6, assume that the operator designates one section of the "SB distribution (descending order)" and then further designates one section of "completion" with the pointer 9b. A set of rules including the CPU rule "normal (ascending order)", the memory rule "SB distribution (descending order)" and the external unit rule "SB distribution (descending order)" generated by selection from the assignment rule table holding unit 41 is output to the small scale test program development processing unit 52 by the rule select processing unit 51. FIG. 6 illustrates exemplary screen displayed on the display unit.

The small scale test program development processing unit 52 assigns the hardware resources of the large scale computer system 10 to the small scale test programs and develops plural small scale test programs based on the control information held in the control information holding unit 42 and the rule for each of the various hardware resources selected by the rule select processing unit 51.

The small scale test program development processing unit 52, upon receipt of the rule set from the rule select processing unit 51, reads the small scale test program from the small scale test program holding unit 43. The small scale test program development processing unit 52 assigns the hardware resources of the large scale computer system 10 to the small scale test programs and thus develops the small scale test programs based on the rule set received and the control information read from the control information holding unit 42. In the case where any of the hardware resources of the large scale computer system 10 is depleted while developing plural small scale test programs, the small scale test program development processing unit 52 no longer assigns the hardware resources to the small scale test programs, and instructs the small scale test program parallel execution unit 53 to execute the developed small scale test programs in parallel.

Figure 7A:
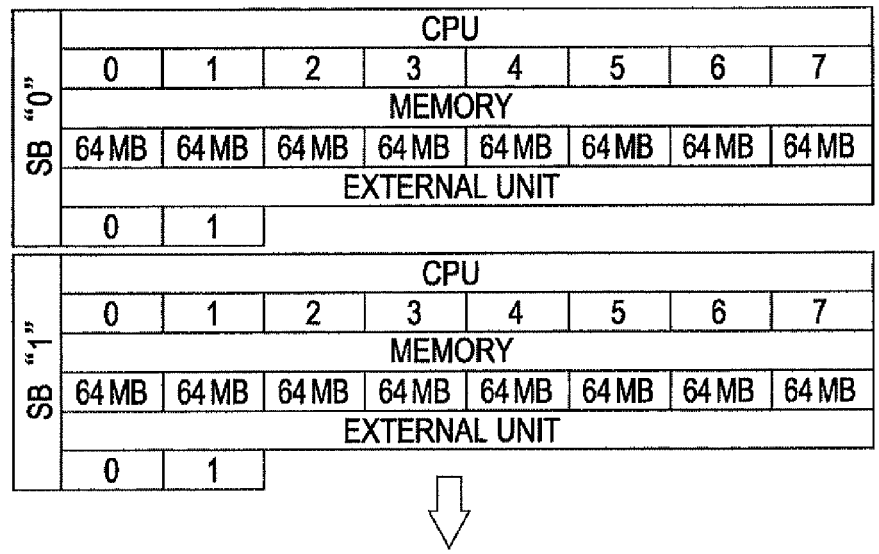
FIGS. 7A to 7C illustrate an exemplary process executed by a small scale test program development processing unit.
Figure 7B:
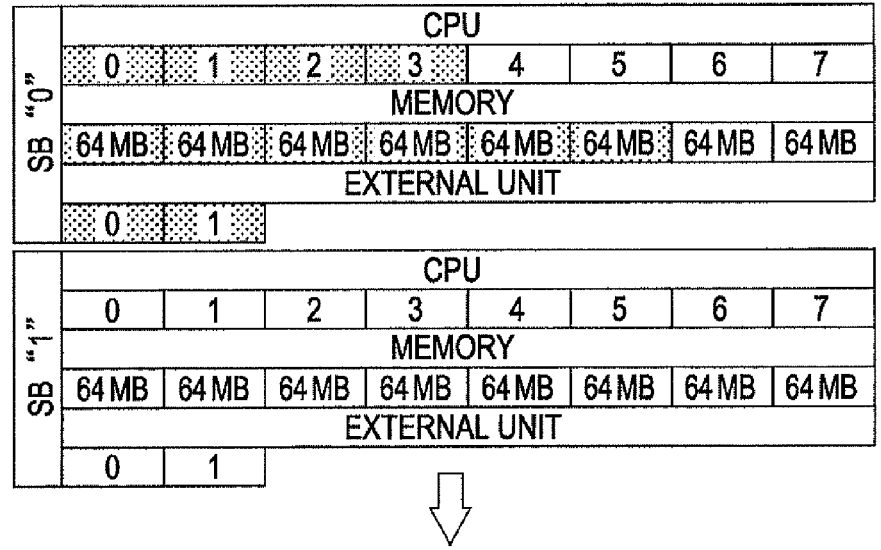
Figure 7C:
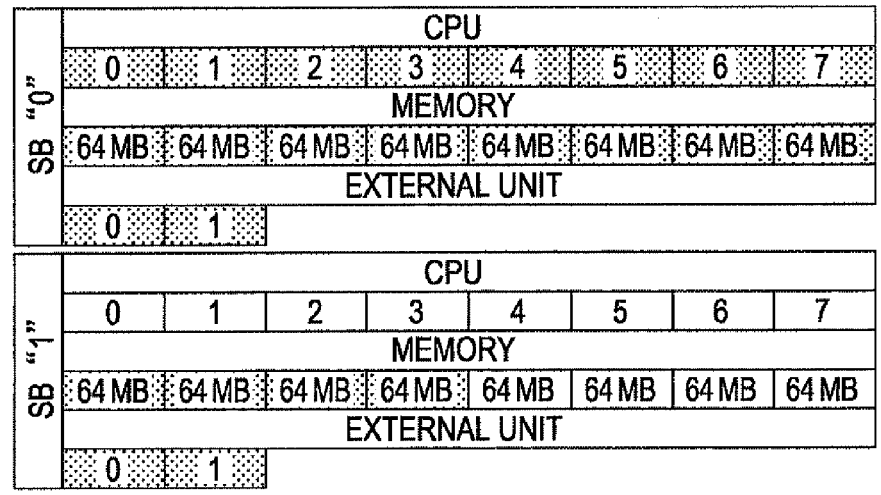

With reference to FIGS. 7A to 7C, a specific example of the process executed by the small scale test program development processing unit 52 will be explained. FIGS. 7A to 7C illustrates an exemplary process executed by the small scale test program development processing unit 52. Assume that the large scale computer system 10 is configured of two system boards having mounted thereon eight pseudo CPUs based on the hyper threading, a memory of 512 MB and two external units. Also, assume that the rule set received by the small scale test program development processing unit 52 from the rule select processing unit 51 is configured of the CPU rule "normal (ascending order)", the memory rule "normal (ascending order)" and the external unit rule "normal (ascending order)". Also, assume that the control information of the small scale test program developed by the small scale test program development processing unit 52 indicates the requirement of four processor cores without any specific limitation, a memory of 384 MB and two external units.

FIG. 7A is a diagram schematically showing the hardware configuration of the large scale computer system with no hardware resources assigned to the small scale test programs. Assume that the hardware resources of the large scale computer system 10 first assigned to the small scale test programs by the small scale test program development processing unit 52 include the CPU "0" to CPU "3" on the system board "0", the memory of 384 MB on the system board "0" and the external units "0 to "1" on the system board "0". FIG. 7B shows state in which these hardware resources may be assigned so.

In the second session, the small scale test program development processing unit 52 assigns the hardware resources of the large scale computer system 10 to the small scale test programs. In this case, the hardware resources assigned to the small scale test programs include the CPU "4" to CPU "7" of the system board "0", the memory of the remaining 128 MB of the system board "0" and the memory of 256 MB of the system board "1" for the total of 384 MB and the external units "0 to "1" of the system board "1". FIG. 7C shows the state in which the hardware resources may be assigned for the second time.

In the third session, the small scale test program development processing unit 52 further tries to assign the hardware resources of the large scale computer system to the small scale test programs. As illustrated in FIG. 7C, however, the two external units required by the small scale test programs cannot be secured from the large scale computer system. As a result, the small scale test program development processing unit 52 ends the process of assigning the hardware resources of the large scale computer system to the small scale test programs.

The small scale test program development processing unit 52, upon completion of the development of the small scale test programs as described above, instructs the small scale test program parallel execution unit 53 to execute the small scale test programs in parallel.

The small scale test program parallel execution unit 53 executes in parallel the small scale test programs developed by the small scale test program development processing unit 52. The small scale test program parallel execution unit 53, based on the instruction from the small scale test program development processing unit 52, executes in parallel the small scale test programs developed in the system. The small scale test program parallel execution unit 53, upon completion of the execution of the small scale test programs without error or upon occurrence of an error in the execution of the small scale test programs, outputs the information indicating the corresponding test result to the test result output unit 54.

The test result output unit 54 displays a predetermined screen indicating the test result on the display unit 30. The test result output unit 54 displays the predetermined screen on the display unit 30 based on the information indicating the test result received from the small scale test program parallel execution unit 53. The test result output unit 54, upon receipt of the control signal input by the operator through the input unit 20 after confirming the test result, switches the display unit 30 from the predetermined screen indicating the test result to the start screen.

Figure 8:
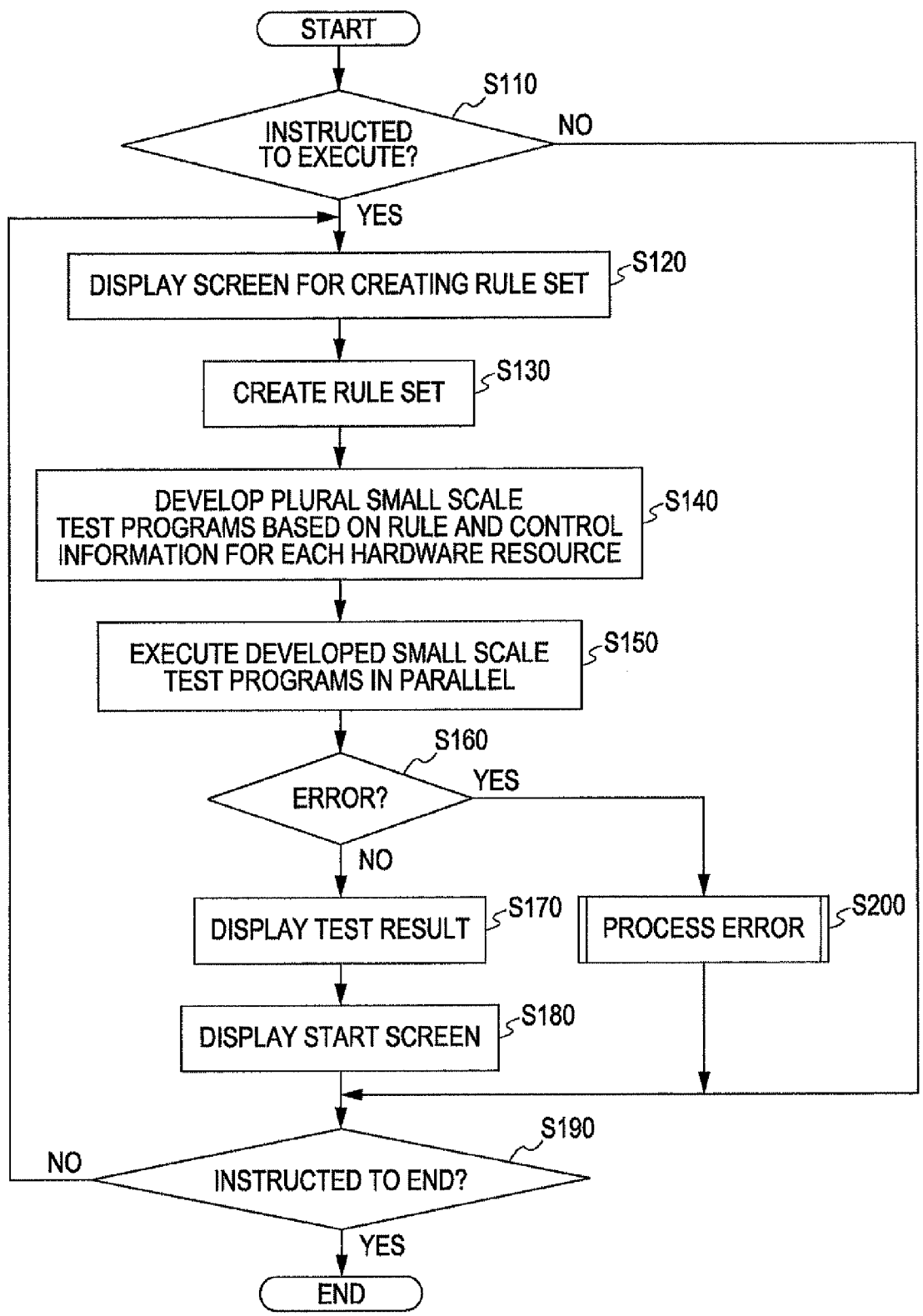
FIG. 8 illustrates an exemplary process executed in the large scale computer system.

The A processing operation of the large scale computer system will be explained with reference to the flowchart of FIG. 8. FIG. 8 illustrates an exemplary process executed by the large scale computer system 10.

As illustrated in FIG. 8, the large scale computer system 10, upon receipt of an instruction to execute the load test program (YES in operation S110), switches the start screen and displays a screen for generating a rule set on the display unit 30 (operation S120). The large scale computer system 10, upon receipt of an instruction to end the load test program (YES in operation S190) without any instruction to execute the load test program (NO in operation S110), ends the process according to the load test program.

The large scale computer system 10, returning to operation S120, accepts the selection of a rule for each of the various hardware resources from the operator, generates a rule set (operation S130), and based on the rule for each of the various hardware resources making up the particular rule set and the control information of the small scale test programs, assigns the hardware resources of the system to the small scale test programs thereby to develop plural small scale test programs (operation S140).

The large scale computer system 10 executes the developed small scale test programs in parallel (operation S150), and judges whether an error is included in the result of execution of the small scale test programs (operation S160). Upon completion of the small scale test programs without any error (NO in operation S160), the large scale computer system 10 displays a predetermined screen on the display unit 30 (operation S170). The large scale computer system 10, upon receipt of the confirmation of the test result from the operator in accordance with the display of the test result on the display unit, displays the test start screen on the display unit 30 (operation S180). The large scale computer system 10, upon receipt of the instruction to end the load test program (YES in operation S190), ends the process according to the load test program. The large scale computer system 10, upon repeated receipt of the instruction to execute the load test program (NO in operation S190), displays the screen for generating a rule set again on the display unit 30 (operation S120) and executes the load test repeatedly.

Returning to operation S160, the large scale computer system 10, upon judgment that the execution of the small scale test programs has developed an error (YES in operation S160), executes a predetermined error processing (operation S200). A predetermined screen indicating the test result may be displayed on the display unit 30 as an error processing or error processing may alternatively be employed a The large scale computer system 10, upon receipt of the confirmation of the test result from the operator in accordance with the display of the test result, displays the start screen on the display unit 30 (operation S180). Upon receipt of the instruction to end the load test program (YES in operation S190), the process according to the load test program is finished.

With reference to FIGS. 9 to 13, an explanation will be given below about the fact that a load is imposed on various different parts of the large scale computer system according to different rule sets. The control information of the small scale test programs developed by the small scale test program development processing unit 52 is, for convenience sake, assumed to be that four processor cores are required though not specifically limited, a memory of a predetermined MB is required and the external units are not used.

Figure 9:
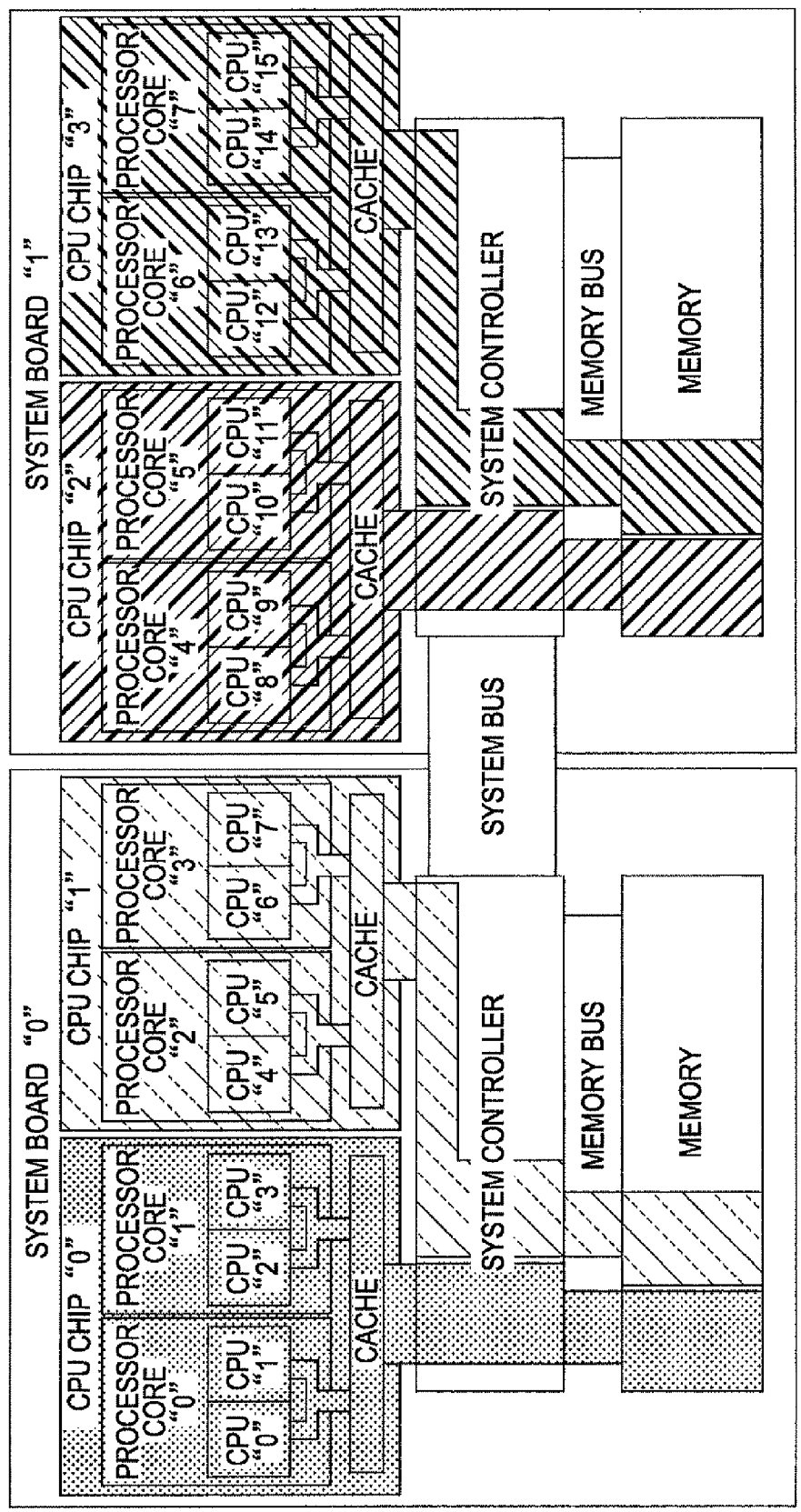
FIG. 9 illustrates a state in which a load is uniformly imposed on the large scale computer system.

First, with reference to FIG. 9, an explanation will be given about a case in which the rule set received by the small scale test program development processing unit 52 is configured of the CPU rule "SB distribution (ascending order)" and the memory rule "SB distribution (ascending order)".

The small scale test program development processing unit 52 assigns the CPU "0" to CPU "3" of the system board "0" and the memory of the predetermined value MB of the system board "0" to the small scale test programs. In the second session, the small scale test program development processing unit 52 assigns the CPU "8" to CPU "11" of the system board "1" and the memory of the predetermined memory MB of the system board "1" to the small scale test programs. In the third session, the small scale test program development processing unit 52 assigns the CPU "4" to CPU "7" of the system board "0" and the memory of the predetermined value MB of the system board "0" to the small scale test programs. Finally, the CPU "12" to CPU "15" of the system board "1" and the memory of the predetermined value MB of the system board "1" may be assigned to the small scale test programs.

The four small scale test programs developed as described above may be executed in parallel by the small scale test program parallel execution unit 53. As illustrated in FIG. 9, the load may be distributed over the memory and the system bus, while the load is concentrated in the CPU chips. In other words, the load is increased on each CPU chip so that a uniform load is imposed on the large scale computer system 10.

Figure 10:
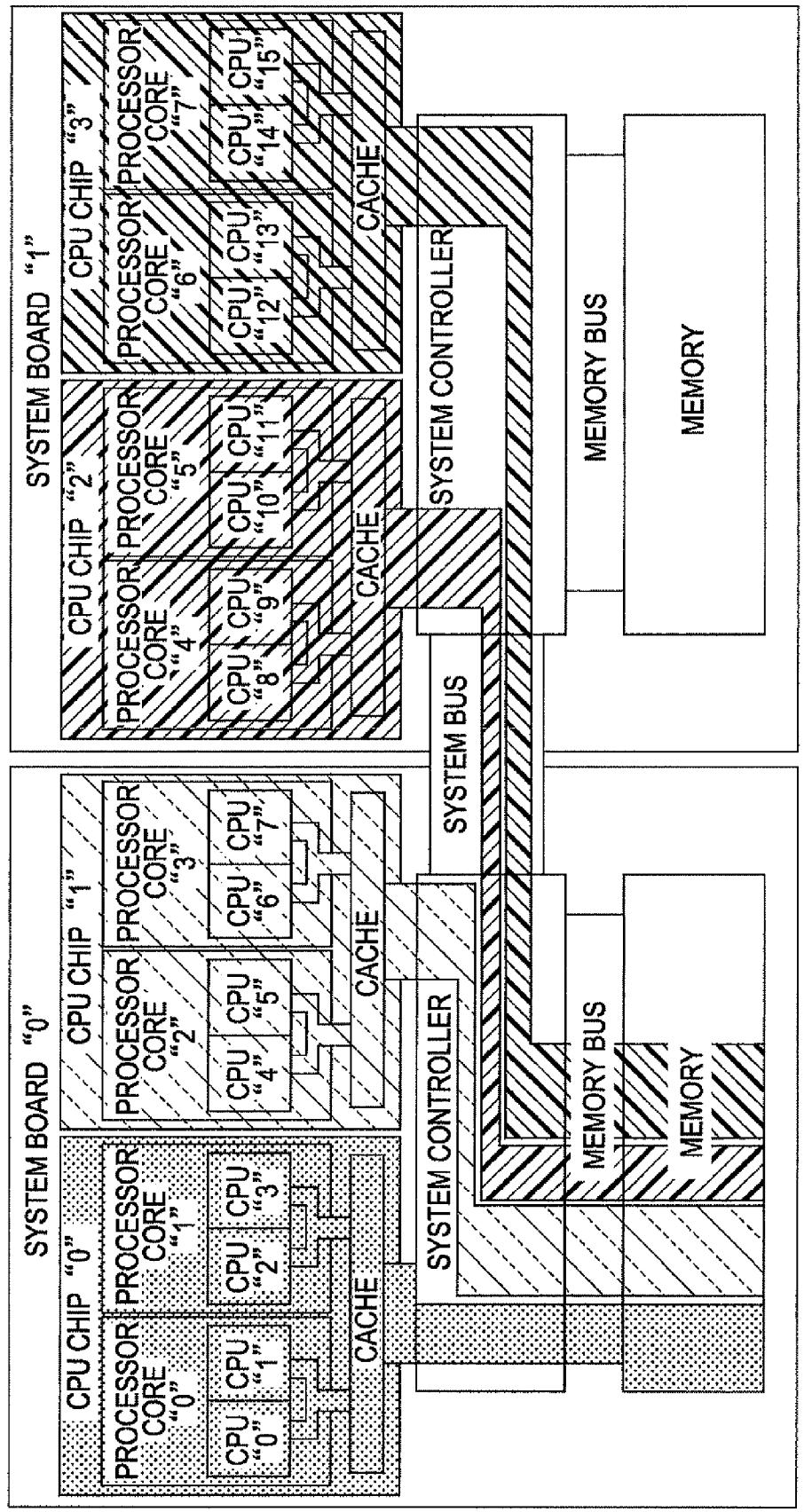
FIG. 10 illustrates a state in which a heavy load is imposed on a specified system board.

Next, with reference to FIG. 10, an explanation will be given about a case in which the set of the rules received by the small scale test program development processing unit 52 is configured of the CPU rule "continuous (ascending order)" and the memory rule "concentrated on specified SB".

In the first session, the small scale test program development processing unit 52 assigns the processor cores CPU "0" to CPU "3" of the system board "0" and the memory of a predetermined value MB of the system board "0" to the small scale test programs. In the second session, the small scale test program development processing unit 52 assigns the processor cores CPU "4" to CPU "7" of the system board "0" and the memory of a predetermined value MB of the system board "0" to the small scale test programs. In the third session, the small scale test program development processing unit 52 assigns the processor cores CPU "8" to CPU "111" of the system board "1" and the memory of a predetermined value MB of the system board "0" to the small scale test programs. In the final session, the small scale test program development processing unit 52 assigns the processor cores CPU "12" to CPU "15" of the system board "1" and the memory of a predetermined value MB of the system board "0" to the small scale test programs. In the case of FIG. 10, unlike in the case of FIG. 9, only the memory mounted on the system board "0" is assigned to the small scale test programs.

The four small scale test program groups developed as described above may be executed in parallel by the small scale test program parallel execution unit 53. As illustrated in FIG. 10, the load on the system controller of the system board "0" is increased.

Figure 11:
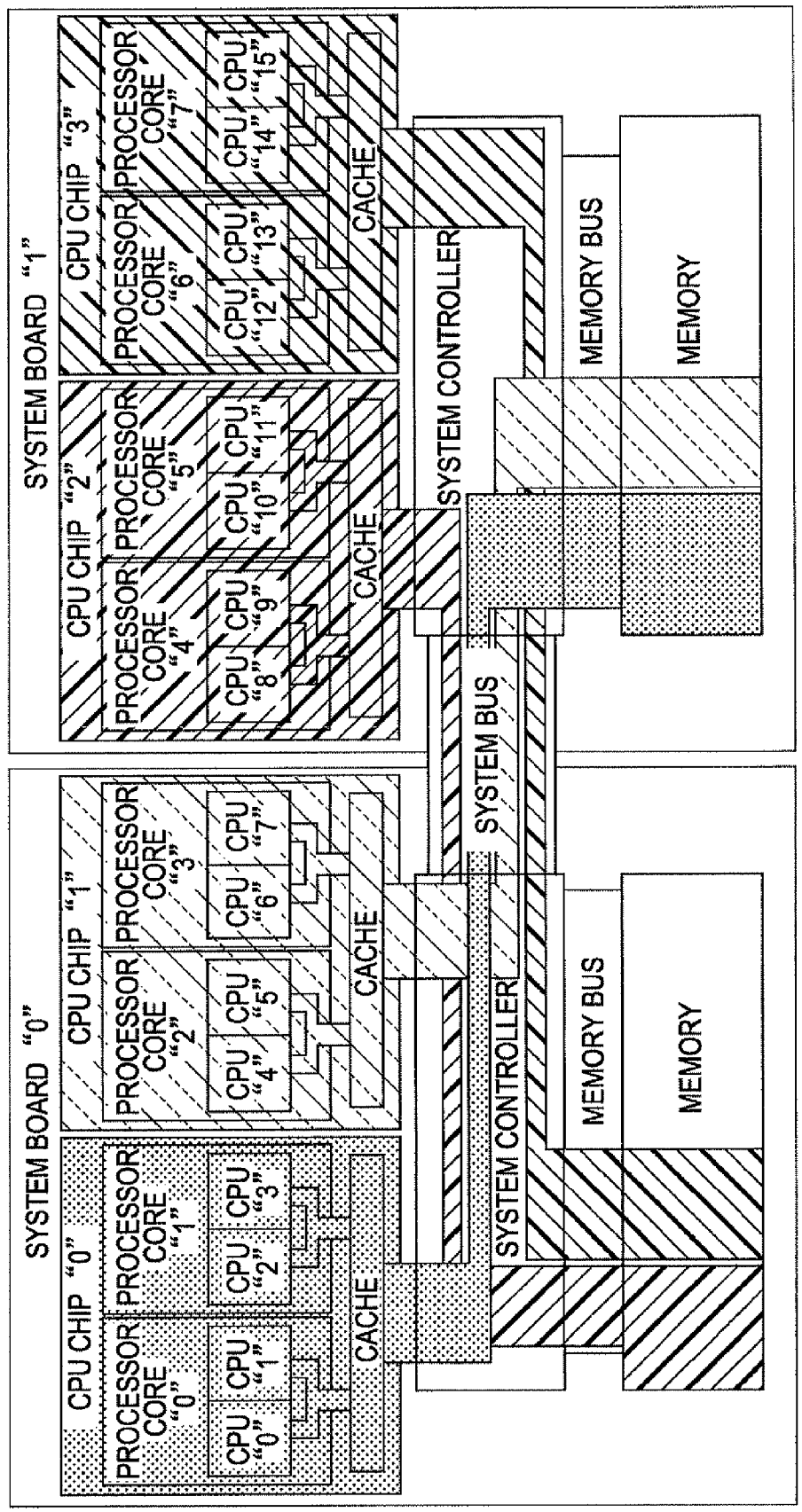
FIG. 11 illustrates a state in which a heavy load is imposed on a system bus.

Next, with reference to FIG. 11, an explanation will be given about a case in which the set of the rules received by the small scale test program development processing unit 52 is configured of the CPU rule "SB distribution (ascending order)" and the memory rule "SB distribution (descending order)".

In the first session, the small scale test program development processing unit 52 assigns the processor cores CPU "0" to CPU "3" of the system board "0" and the memory of a predetermined value MB of the system board "1" to the small scale test program. In the second session, the small scale test program development processing unit 52 assigns the processor cores CPU "8" to CPU "11" of the system board "1" and the memory of a predetermined value MB of the system board "0" to the small scale test programs. In the third session, the small scale test program development processing unit 52 assigns the processor cores CPU "4" to CPU "7" of the system board "0" and the memory of a predetermined value MB of the system board "1" to the small scale test programs. In the final session, the small scale test program development processing unit 52 assigns the processor cores CPU "12" to CPU "15" of the system board "1" and the memory of a predetermined value MB of the system board "0" to the small scale test programs.

The four small scale test program groups developed as described above may be executed in parallel by the small scale test program parallel execution unit 53. Since the small scale test programs may be executed by the processor cores and the memories in relative positions over the system boards as illustrated in FIG. 11, the load is increased on the system bus used for data transfer between the system boards.

Figure 12:
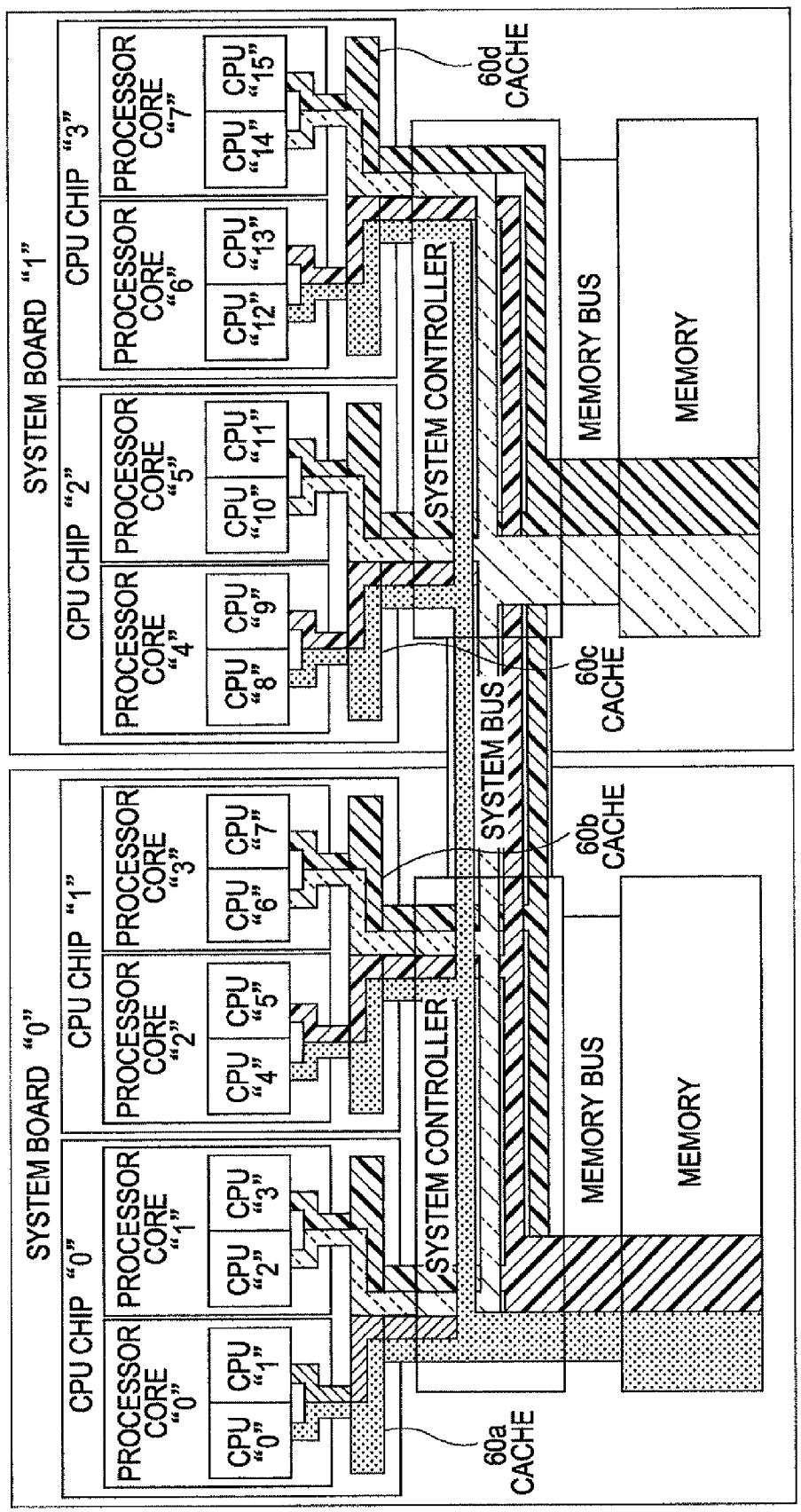
FIG. 12 illustrates a state in which cache data transfer frequently occurs between CPUs.

Next, with reference to FIG. 12, an explanation will be given about a case in which the set of the rules received by the small scale test program development processing unit 52 is configured of the CPU rule "one thread from within one chip" and the memory rule "SB distribution (ascending order)".

In the first session, the small scale test program development processing unit 52 assigns the processor cores CPU "0" and CPU "4" of the system board "0" and the processor cores CPU "8" and CPU "12" of the system board "1" and the memory of a predetermined value MB of the system board "0" to the small scale test programs. In the second session, the small scale test program development processing unit 52 assigns the processor cores CPU "1" and CPU "5" of the system board "0" and the processor cores CPU "9" and CPU "13" of the system board "1" and the memory of a predetermined value MB of the system board "0" to the small scale test programs. In the third session, the small scale test program development processing unit 52 assigns the processor cores CPU "2" and CPU "6" of the system board "0" and the processor cores CPU "10" and CPU "14" of the system board "1" and the memory of a predetermined value MB of the system board "1" to the small scale test programs. In the final session, the small scale test program development processing unit 52 assigns the processor cores CPU "3" and CPU "7" of the system board "0" and the processor cores CPU "11" and CPU "15" of the system board "1" and the memory of a predetermined value MB of the system board "1" to the small scale test programs.

The four small scale test program groups developed as described above may be executed in parallel by the small scale test program parallel execution unit 53. As illustrated in FIG. 12, plural small scale test programs may be executed on one CPU chip, and therefore, the cache data are transferred frequently between the pseudo CPUs based on the hyper threading, so that the load is increased on the caches 60a to 60d.

Figure 13:
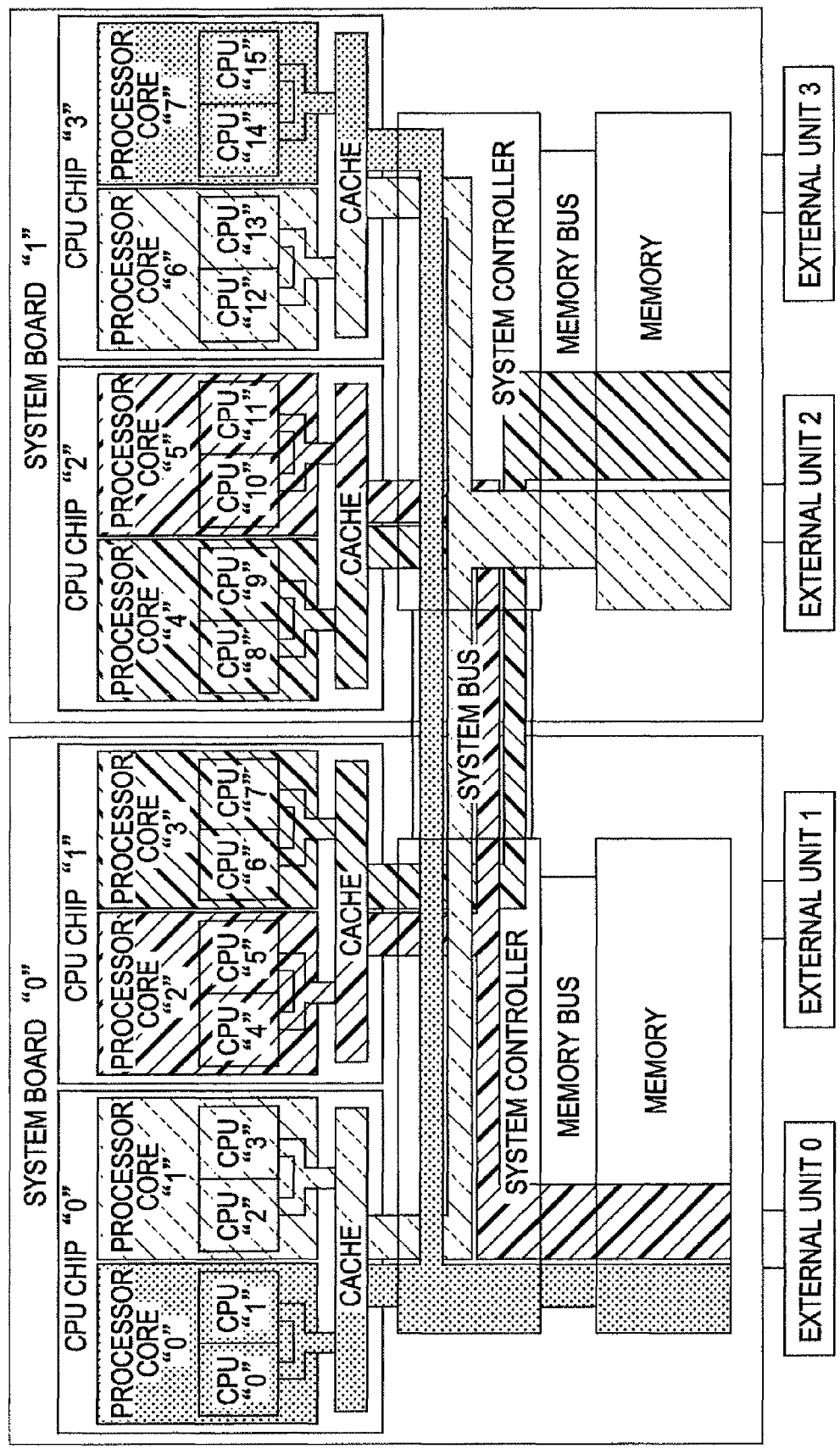
FIG. 13 illustrates a state in which data transfer paths are differentiated.

Finally, with reference to FIG. 13, an explanation will be given about a case in which the set of the rules received by the small scale test program development processing unit 52 is configured of the CPU rule "accordion" and the memory rule "SB distribution (ascending order)".

In the first session, the small scale test program development processing unit 52 assigns the processor cores CPU "0" and CPU "1" of the system board "0" and the processor cores CPU "15" and CPU "14" of the system board "1" and the memory of a predetermined value MB of the system board "0" to the small scale test programs. In the second session, the small scale test program development processing unit 52 assigns the processor cores CPU "2" and CPU "3" of the system board "0" and the processor cores CPU "13" and CPU "12" of the system board "1" and the memory of a predetermined value MB of the system board "1" to the small scale test programs. In the third session, the small scale test program development processing unit 52 assigns the processor cores CPU "4" and CPU "5" of the system board "0" and the processor cores CPU "11" and the CPU "10" of the system board "1" and the memory of a predetermined value MB of the system board "0" to the small scale test programs. In the last session, the small scale test program development processing unit 52 assigns the processor cores CPU "6" and CPU "7" of the system board "0" and the processor cores CPU "9" and CPU "8" of the system board "1" and the memory of a predetermined value MB of the system board "1" to the small scale test programs.

The four small scale test program groups developed as described above may be executed in parallel by the small scale test program parallel execution unit 53. As illustrated in FIG. 13, the small scale test programs assigned the CPU "0", the CPU "1", the CPU "15" and the CPU "14" use the longest data transfer path in the configuration of the hardware resources, while the small scale test programs assigned the CPU "6", the CPU "7", the CPU "8" and the CPU "9" use the shortest data transfer path in the configuration of the hardware resources. In this way, the load is imposed on the system board while different data transfer paths cross each other.

According to an embodiment, various rule sets are held in advance, and based on the rule sets thus held, the small scale test programs may be assigned sequentially. This is in order to create a state in which a load is imposed on various parts of a large scale computer system automatically, and by thus saving the labor of selecting a rule, the acquisition of the test result is facilitated.

Figure 14:
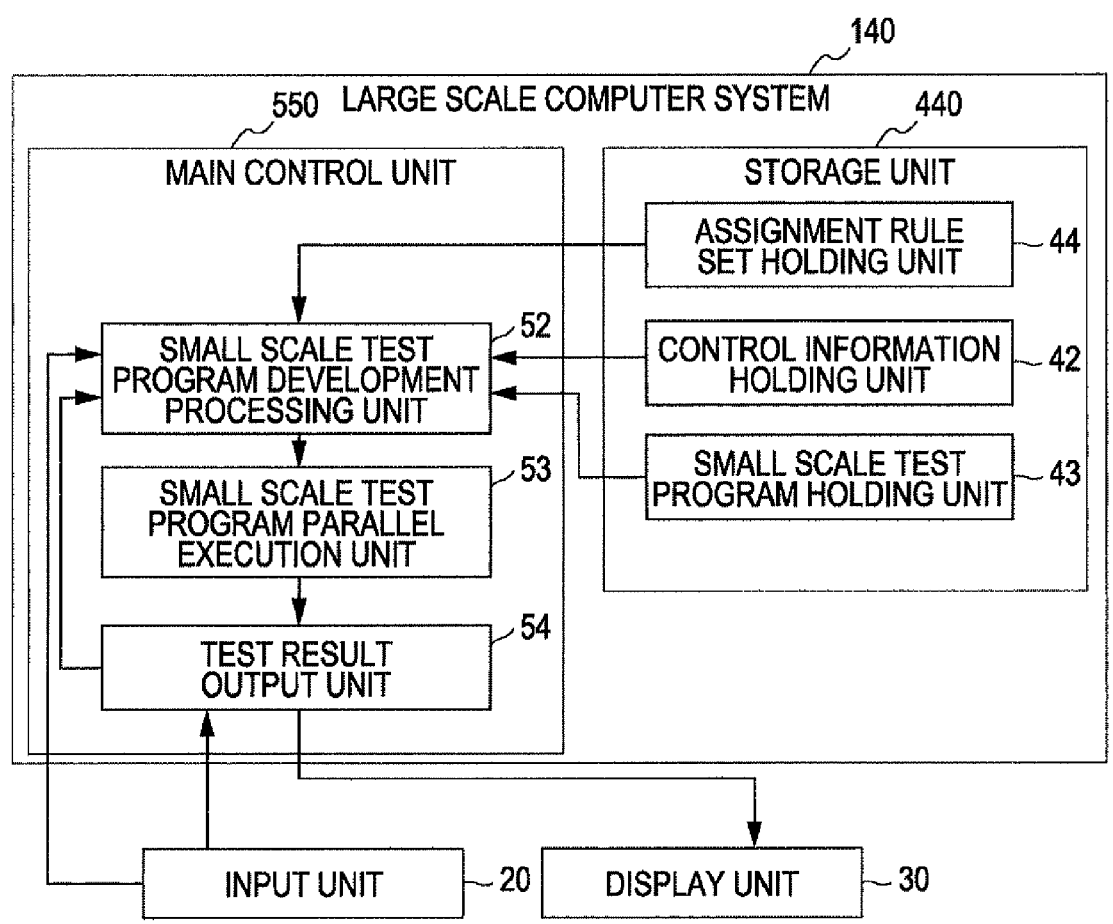
FIG. 14 illustrates a large scale computer system according to an embodiment.

With reference to FIG. 14, the configuration of the large scale computer system according to an embodiment will be explained. FIG. 14 illustrates a large scale computer system according to an embodiment.

As illustrated in FIG. 14, the large scale computer system 140 includes an input unit 20, a display unit 30, a storage unit 440 and a main control unit 550, and the rule select processing unit 51 and the assignment rule table holding unit 41 are eliminated while an assignment rule set holding unit 44 is added anew to the storage unit 440. The component parts operating the same way and having the same function as previously disclosed are not described. The description that follows, therefore, deals with the assignment rule set holding unit 44, the small scale test program development processing unit 52 and the test result output unit 54.

The assignment rule set holding unit 44 holds a group of rule sets selected to impose a load on the intended parts for the load test of the large scale computer system 140. The assignment rule set holding unit 44, as illustrated in FIG. 15, holds plural rule sets for each of the various hardware resources and also holds an ID with which a particular rule set is uniquely identifiable. The ID assigned to a given set is desirably the information arranged in a predetermined order in which the processes may be executed by the small scale test program development processing unit 52 based on the ID. The assignment rule set holding unit 44, though not directly related to the process by the large scale computer system 140, gives a comment indicating on which part of the large scale computer system 140 a load is imposed for each rule set. As illustrated in FIG. 15, for example, the assignment rule set holding unit 44 holds the rule set, with the ID "1" and the comment "CPU chip load" assigned thereto, including the CPU rule "SB distribution (ascending order)", the memory rule "SB distribution (ascending order)" and the external unit rule "SB distribution (ascending order)". FIG. 15 illustrates exemplary information stored by the assignment rule set holding unit 44.

The small scale test program development processing unit 52, upon receipt of an instruction from the input unit 20 to execute the load test program received by the input unit 20, first reads the rule set with the ID "1" from the assignment rule set holding unit 44. The small scale test program development processing unit 52 reads the small scale test programs from the small scale test program holding unit 43, and based on the rule set and the control information, assigns the hardware resources of the large scale computer system 140 to the small scale test programs. The small scale test program development processing unit 52 which develops plural small scale test programs, upon depletion of any of the hardware resources of the large scale computer system 140, instructs the small scale test program parallel execution unit 53 to execute the developed small scale test programs in parallel. The process executed subsequently by the small scale test program parallel execution unit 53 is similar to the corresponding process as already disclosed.

The test result output unit 54 displays a predetermined screen indicating the test result on the display unit 30 based on the information indicating the test result received from the small scale test program parallel execution unit 53. In the process, the test result output unit 54, upon confirmation of the test result and receipt of the control signal input through the input unit 20 by the operator, instructs the small scale test program development processing unit 52 to read the next rule set and develop the small scale test programs.

The small scale test program development processing unit 52, based on the instruction from the test result output unit 54, reads the rule set with the ID "2" from the assignment rule set holding unit 44. The small scale test program development processing unit 52 reads the small scale test program from the small scale test program holding unit 43, and based on the rule set and the control information, assigns the hardware resources of the large scale computer system 140 to the small scale test program. In this way, based on all the rule sets held by the assignment rule set holding unit 44, a load is imposed on various parts of the large scale computer system automatically.

According to an embodiment, the hardware resources remaining after being assigned to the small scale test programs may be assigned to the disturbance test program, which is also executed in parallel with the small scale test programs. This is in order to impose a load on a predetermined part of the large scale computer system in a real environment as compared with the case where the remaining hardware resources are not assigned to the disturbance test program.

Also, according to an embodiment, the small scale test program to which the various hardware resources of the large scale computer system may be assigned can be selected arbitrarily from plural small scale test programs having different control information.

Figure 16:
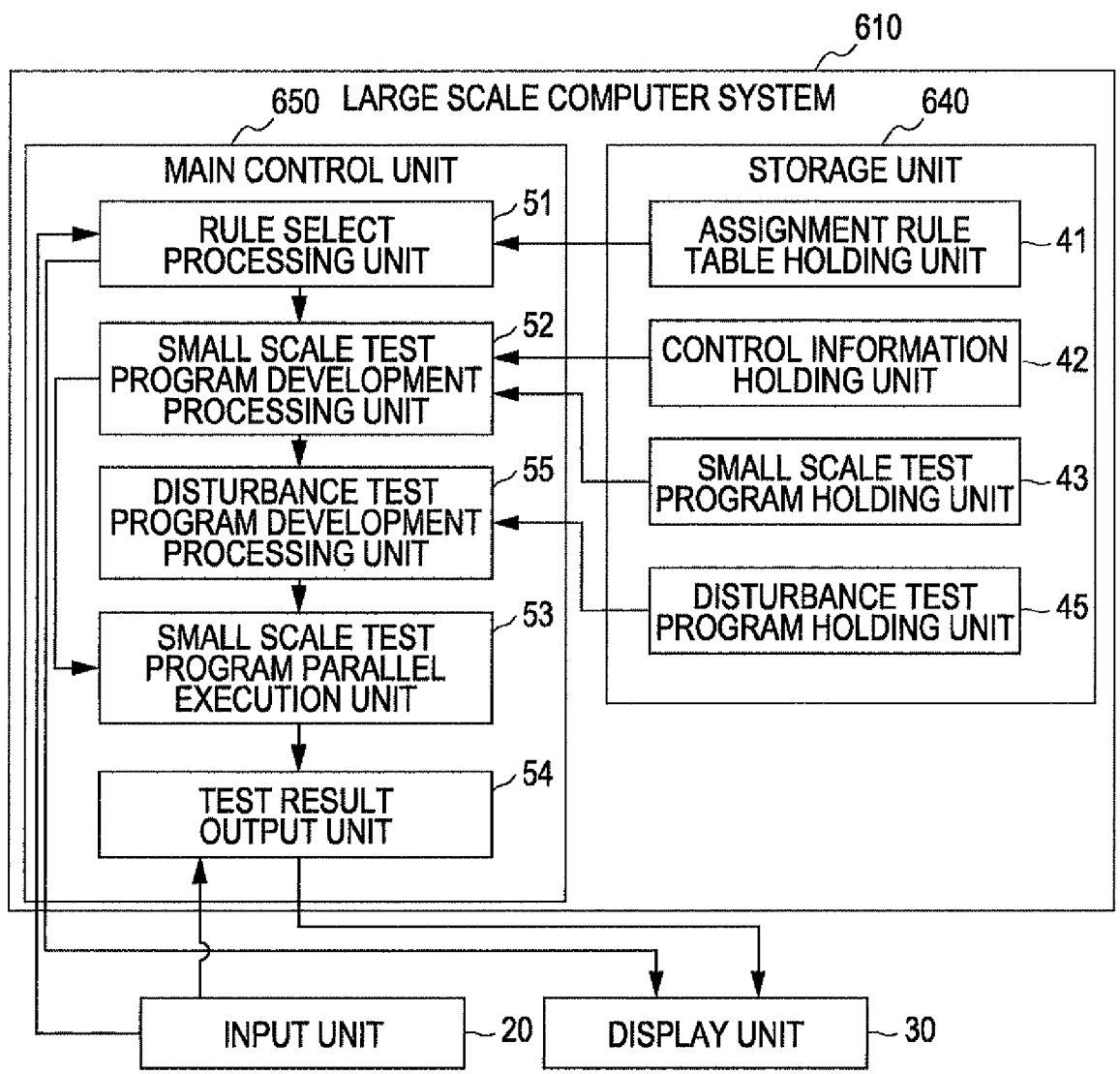
FIG. 16 illustrates a large scale computer system according to an embodiment.

With reference to FIG. 16, the configuration of the large scale computer system according to an embodiment will be explained. FIG. 16 illustrates a large scale computer system according to an embodiment.

As illustrated in FIG. 16, the large scale computer system 610 includes an input unit 20, a display unit 301a storage unit 640 and a main control unit 650, and a disturbance test program holding unit 45 is newly added to the storage unit 640, and a disturbance test program development processing unit 55 to the main control unit 650. The component parts which operate the same way and have the same functions as the corresponding parts of an embodiment are not described, and an explanation will be given below about the control information holding unit 42, the small scale test program holding unit 43, the disturbance test program holding unit 45, the rule select processing unit 51, the small scale test program development processing unit 52, the small scale test program parallel execution unit 53 and the disturbance test program development processing unit 55.

The rule select processing unit 51 designates a rule for each of the various hardware resources by the operation of the operator through the input unit 20 while at the same time receiving from the input unit 20 the control signal for designating the small scale test program to be developed. For example, one section may be formed on the screen illustrated in FIG. 6 to select one of the plural small scale test programs having different control information. The rule select processing unit 51 outputs a rule set and an ID which can uniquely identify the selected small scale test program to the small scale test program development processing unit 52.

Before explaining the process executed in the small scale test program development processing unit 52, the control information holding unit 42 and the small scale test program holding unit 43 will be explained.

The control information holding unit 42, as illustrated in FIG. 17, stores therein, in correspondence with each other, the small scale test program ID and the control information having added thereto the information indicating whether the disturbance is permitted or not. The control information holding unit 42 holds therein, for example, the small scale test program ID "A" in correspondence with the control information "C1" indicating the requirement of "four processor cores without specific limitation", "a memory of 384 MB", "two" external units and the disturbance permitted. FIG. 17 illustrates exemplary information stored in the control information holding unit.

The small scale test program holding unit 43 holds plural small scale test programs having different control information. As illustrated in FIG. 18, the small scale test program holding unit 43 holds the small scale test program ID "A" and the entity "PGI" of the small scale test program in correspondence with each other. FIG. 18 illustrates exemplary information held by the small scale test program holding unit 43.

The small scale test program development processing unit 52, upon receipt of a rule set and the small scale test program ID from the rule select processing unit 51, reads the small scale test program corresponding to the particular small scale test program ID from the small scale test program holding unit 43. The small scale test program development processing unit 52, based on the rule set received and the control information corresponding to the small scale test program ID read from the control information holding unit 42, assigns the hardware resources of the large scale computer system 610 to the small scale test program and thus develops the particular small scale test program. In the case where the disturbance is permitted for the small scale test program developed, the small scale test program development processing unit 52 instructs the disturbance test program development processing unit 55 to assign the disturbance test program to the remaining hardware resources. In the case where the disturbance is not permitted for the small scale test program developed, on the other hand, the small scale test program development processing unit 52 instructs the small scale test program parallel execution unit 53 to execute the developed small scale test programs in parallel.

The disturbance test program holding unit 45 holds the disturbance test program which is a test program for disturbances.

The disturbance test program development processing unit 55 assigns the remaining hardware resources not assigned to the small scale test programs to the disturbance test program thereby to develop the particular disturbance test program. The disturbance test program development processing unit 55, upon receipt of an instruction from the small scale test program development processing unit 52 to assign the disturbance test program to the remaining hardware resources, reads the disturbance test program from the disturbance test program holding unit 45, and develops by assigning the particular disturbance test program to the remaining hardware resource. The disturbance test program development processing unit 55 instructs the small scale test program parallel execution unit 53 to execute the developed disturbance test program and the small scale test programs in parallel to each other.

The small scale test program parallel execution unit 53, based on an instruction from the small scale test program development processing unit 52 or the disturbance test program development processing unit 55, executes in parallel the small scale test programs and the disturbance test program developed in the system.

Figure 19:
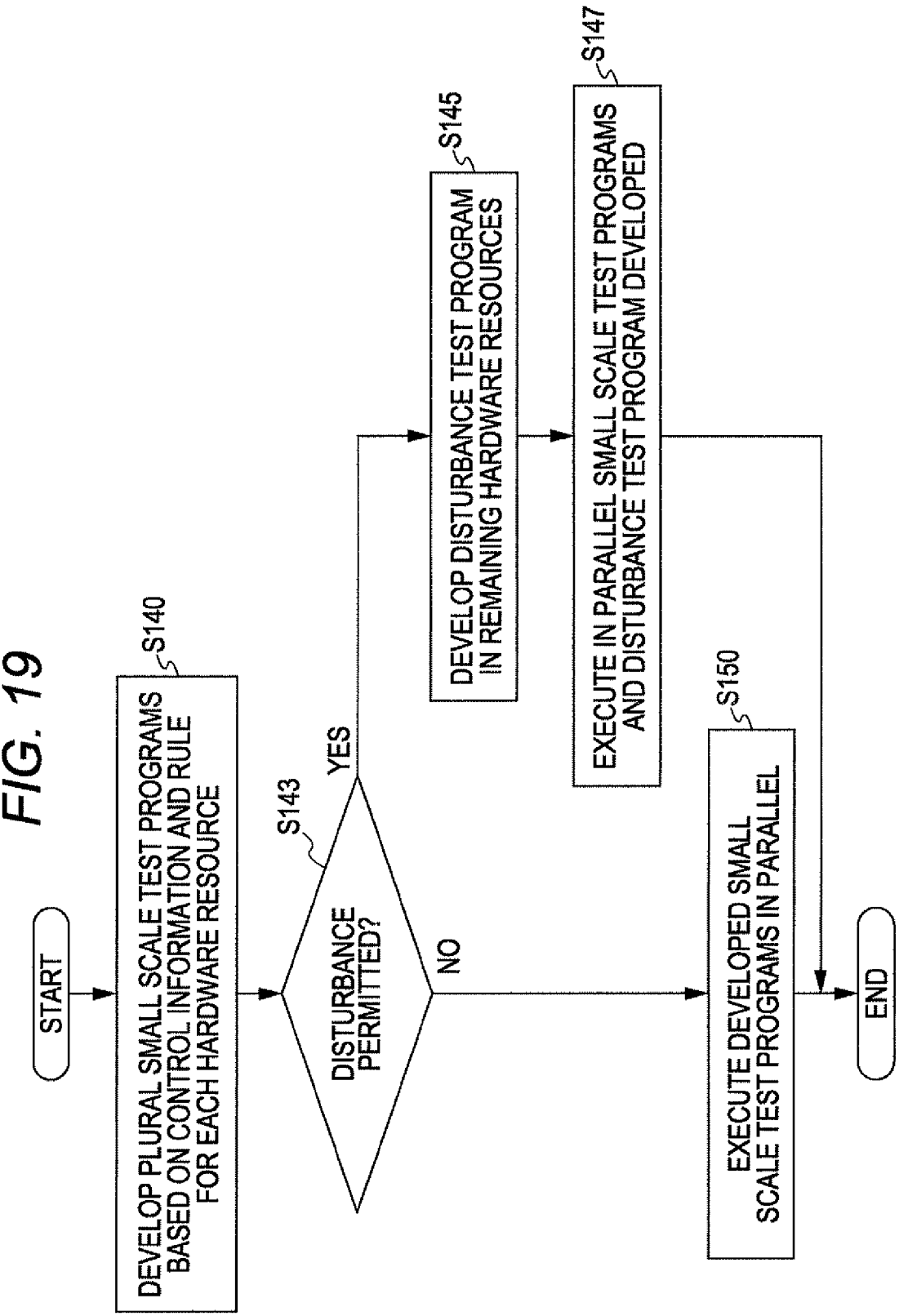
FIG. 19 illustrates an exemplary process of developing a disturbance program.

Now, the processing operation of the large scale computer system will be explained with reference to the flowchart of FIG. 19. FIG. 19 illustrates parts different in processing operation from those previously disclosed and other operations are not illustrated. FIG. 19 illustrates an exemplary process for developing the disturbance program.

As illustrated in FIG. 19, the large scale computer system develops plural small scale test programs by assigning the hardware resources of its own to the small scale test programs based on the rule for each hardware resource and the control information of the small scale test programs (operation S140).

In the case where the disturbance is permitted for the small scale test programs assigned the hardware resources (YES in operation S143), the large scale computer system develops by assigning the disturbance test program to the remaining hardware resources (operation S145) and executes the small scale test programs and the disturbance test program in parallel (operation S147).

The process is returned to operation S143, and in the case where the disturbance is not permitted for the small scale test programs assigned the hardware resources (NO in operation S143), the large scale computer system executes the developed small scale test programs in parallel (operation S150).

According to an embodiment, the small scale test programs may be executed again in a different form in the case where an error occurs in the parallel execution of the small scale test programs. This is in order to collect the detailed information on the cause of the fault.

Figure 20:
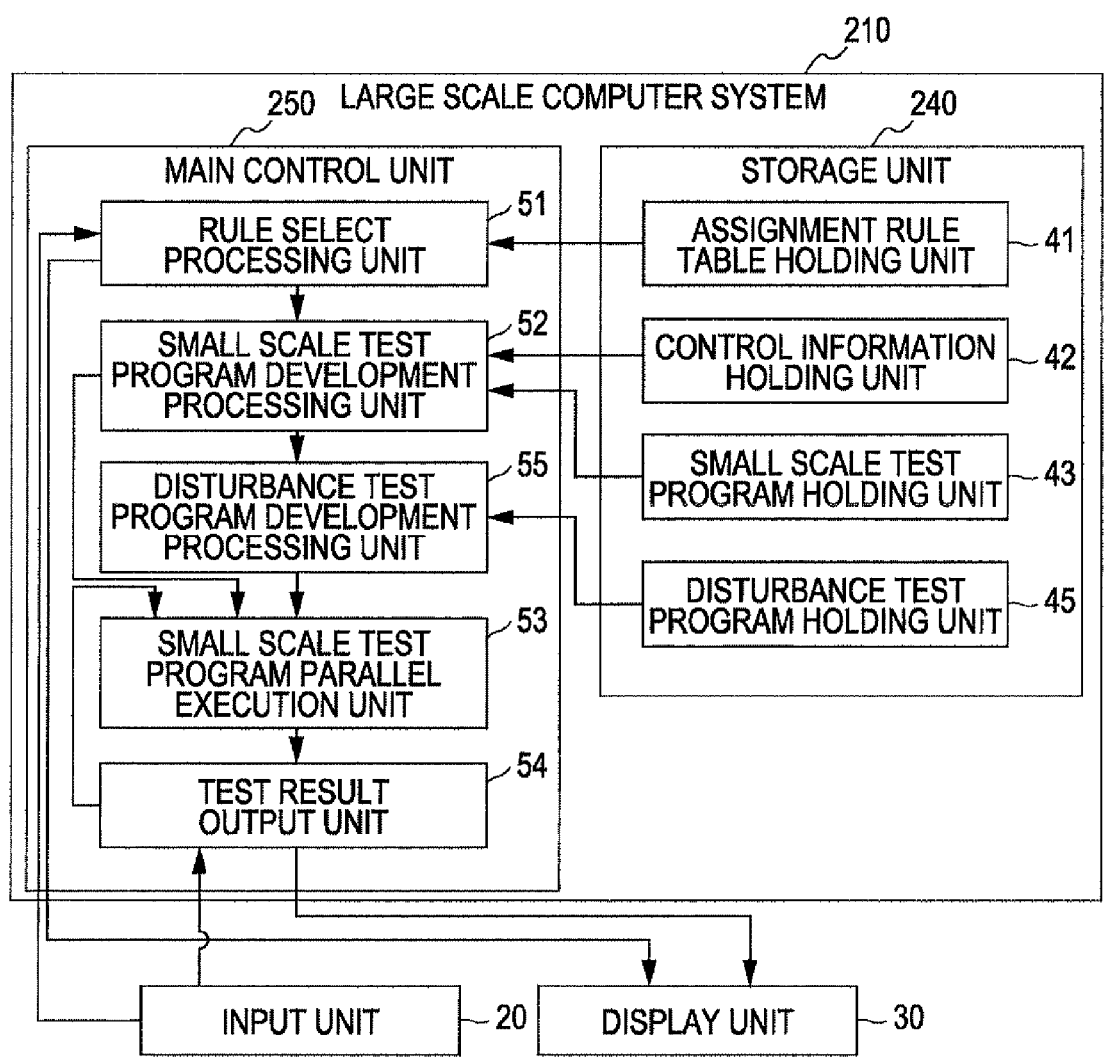
FIG. 20 illustrates a large scale computer system according to an embodiment.

FIG. 20 illustrates a large scale computer system according to an embodiment. As illustrated in FIG. 20, the large scale computer system 210 includes a main control unit 250 and a storage unit 240, though similar to the large scale computer system 10 according to an embodiment, is different from it in that the path from the test result output unit 54 to the small scale test program parallel execution unit 53 is added.

Figure 21:
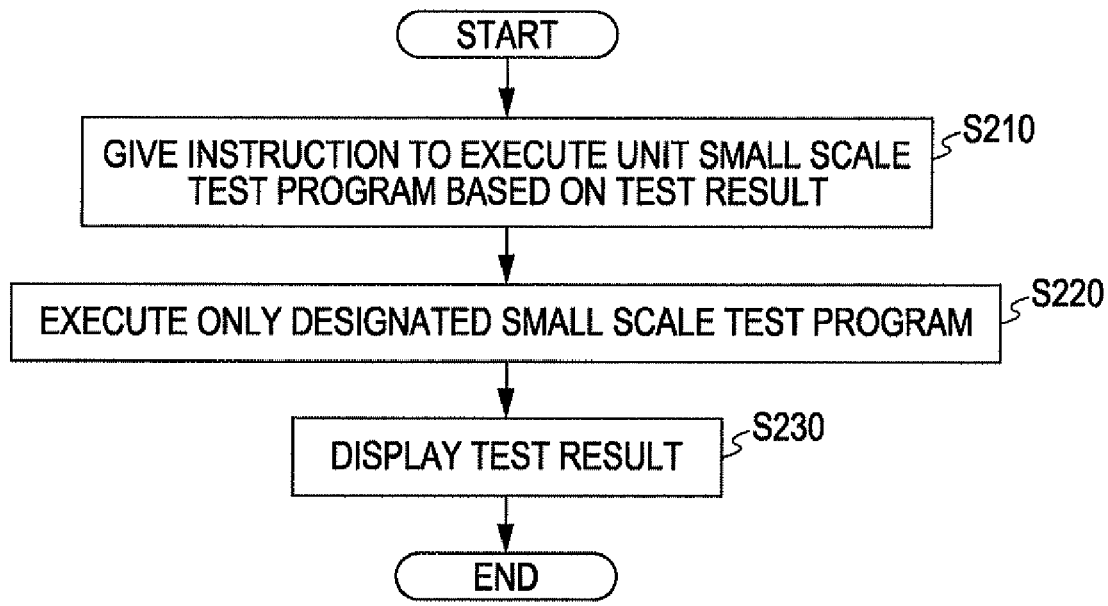
FIG. 21 illustrates exemplary error processing.
Figure 22:
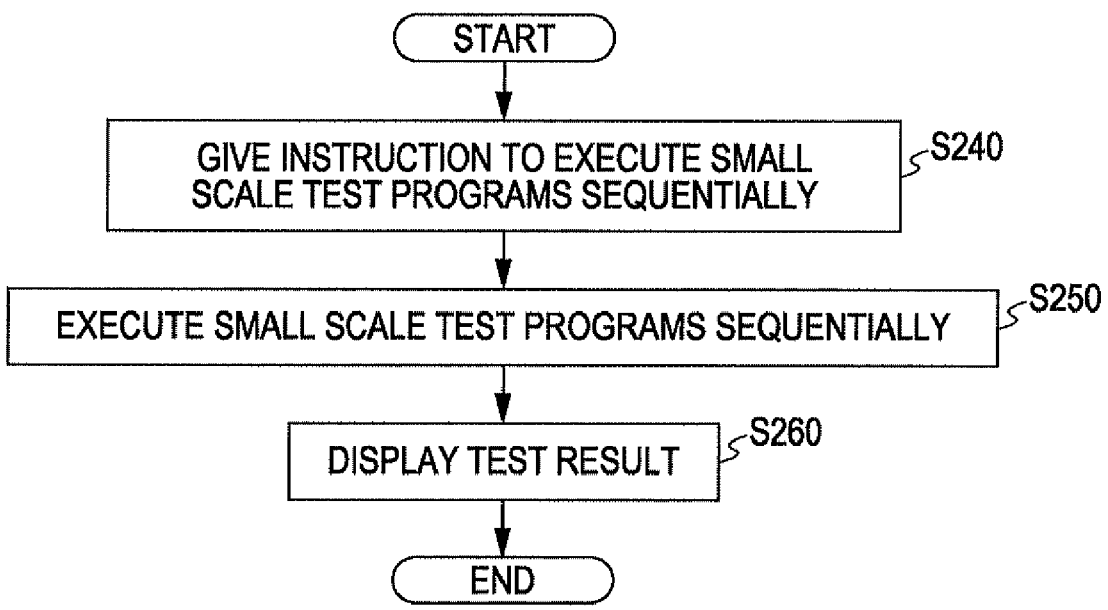
FIG. 22 illustrates exemplary error processing.
Figure 23:
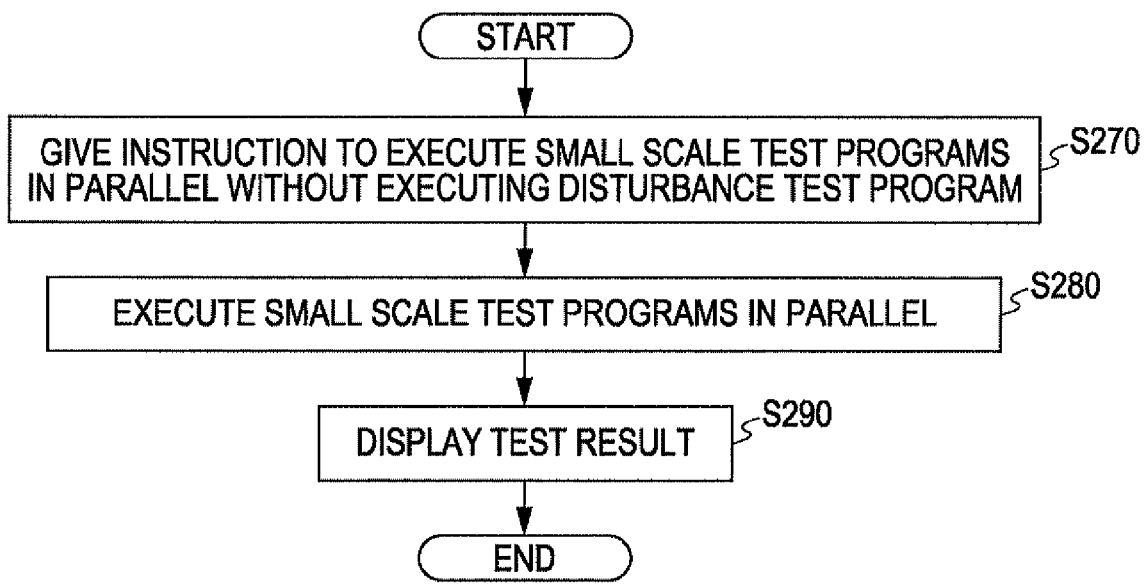
FIG. 23 illustrates exemplary error processing.

With reference to the flowcharts of FIGS. 21 to 23, the processing operation of the test result output unit 54 and the small scale test program parallel execution unit 53 will be explained below. FIGS. 21 to 23 illustrate error processing in operation S200 in FIG. 8.

The test result output unit 54, based on the information indicating the test result received from the small scale test program parallel execution unit 53, displays a predetermined screen on the display unit 30.

The test result output unit 54, upon receipt of the test result output from the small scale test program parallel execution unit 53 with an error, if any, as illustrated in FIG. 21, for example, instructs the small scale test program parallel execution unit 53 to execute a single small scale test program based on the test result (operation S210). The small scale test program parallel execution unit 53 executes only the small scale test program designated by the test result output unit 54 (operation S220). The test result output unit 54 displays a predetermined screen based on the information indicating the test result received from the small scale test program parallel execution unit 53 (operation S230).

Also, the test result output unit 54, as illustrated in FIG. 22, for example, instructs the small scale test program parallel execution unit 53 to execute the small scale test programs in parallel sequentially (operation S240). The small scale test program parallel execution unit 53 then executes the small scale test programs sequentially as instructed by the test result output unit 54 (operation S250). The test result output unit 54 displays a predetermined screen based on the information indicating the test result received from the small scale test program parallel execution unit 53 (operation S260).

Further, the test result output unit 54, as illustrated in FIG. 23, for example, instructs the small scale test program parallel execution unit 53 to execute the small scale test programs in parallel without executing the disturbance test program (operation S270). The small scale test program parallel execution unit 53, in response to the instruction from the test result output unit 54, executes the small scale test programs in parallel (operation S280). The test result output unit 54 displays a predetermined screen based on the information indicating the test result received from the small scale test program parallel execution unit 53 (operation S290).

Apart from the embodiments described above, an exemplary embodiment may be embodied in any of various other different forms.

Figure 24:
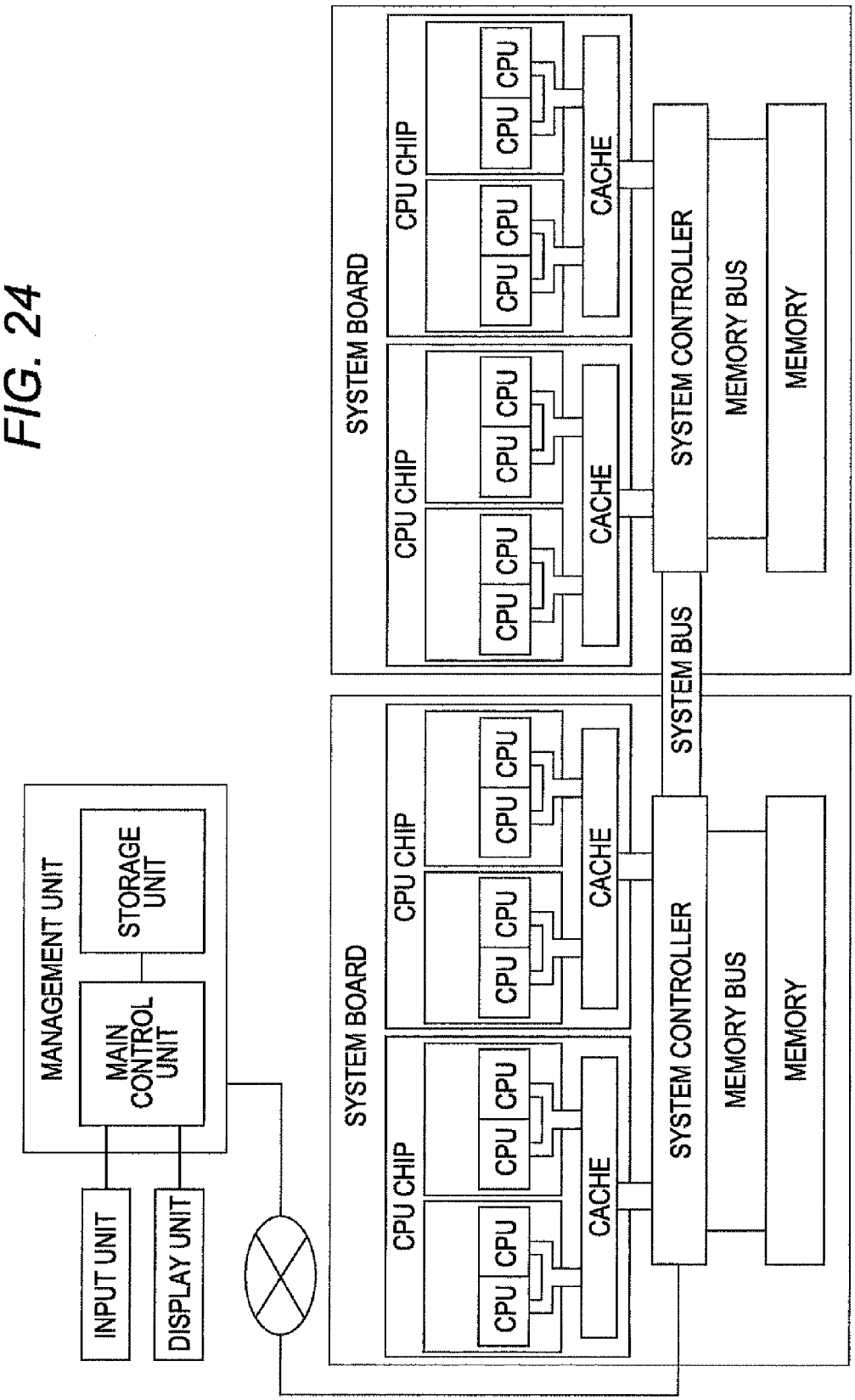
FIG. 24 illustrates a management unit for managing the large scale computer from outside.

The embodiments described above represent a case in which the external units of the large scale computer system are used as an input unit, a display unit and a storage unit. An exemplary embodiment, however, is not limited to this configuration, and as illustrated in FIG. 24, a management unit having an input unit, a display unit, a main control unit and a storage unit may be connected communicably with the large scale computer system through a network such as LAN (Local Area Network).

An exemplary embodiment disclosed above includes a small scale test program having a small amount of hardware resources assigned as compared with the hardware configuration of the large scale computer system is used as a predetermined load test program. However, the embodiments are not limited to such a case, and a logic verification program with control information may alternatively be used.

According to an exemplary embodiment, the control information indicating the types of the hardware resources required for executing the predetermined load test program and the quantitative conditions determined for each type of the hardware resources and an assignment table containing a rule for each of the various hardware resources to assign the computer hardware resources to the predetermined load test program are held in a predetermined storage unit in advance.

A rule is selected for each of the various hardware resources from the assignment rule table in such a manner as to impose a load on a predetermined part of the computer. Based on the rule thus selected and the control information, the computer hardware resources may be assigned to the predetermined load test program thereby to develop plural predetermined load test programs. The load test programs thus developed may be executed in parallel. By doing so, a state can be created in which a heavy load is imposed on a predetermined part of the large scale computer system. Further, depending on the combination of the rules for each of the hardware resources, a heavy load can be imposed on various parts, so that a satisfactory test result can be obtained in the stage of the load test of the large scale computer system. Also, in view of the fact that a predetermined load test program is utilized and not all the programs are newly created, a test program is provided with a small labor of development. Furthermore, the stand-alone type not operating under the control of OS makes it possible to collect information in case of a fault.

Also, according to an exemplary embodiment, plural sets of rules selected from the assignment rule table are held in advance in such a manner that a load is imposed on a part intended by the load test of the computer. Based on the control information and each one of the plural sets, the computer hardware resources may be assigned to a predetermined load test program so that a plurality of the predetermined load test programs are developed. By doing so, as compared with the method in which the operator selects the assignment rule for each of various hardware resources, for example, a state can be created in which a heavy load is imposed on various parts automatically. Thus, a satisfactory test result can be obtained more easily in the stage of the load test of the large scale computer system.

Also, according to an exemplary embodiment, since the predetermined control information is utilized by being added to the logic verification test program, the labor consumed for the development can be further reduced.

Further, according to an exemplary embodiment, the remaining hardware resources not assigned to the predetermined load test program may be assigned to the disturbance test program to develop the disturbance test program. The load test programs and the disturbance test program may be executed in parallel. By doing so, as compared with a case in which the disturbance test program is not assigned to the remaining hardware resources, a state can be created in which a heavy load is imposed on a predetermined part in a more realistic environment.

Also, according to an exemplary embodiment, any predetermined load test program which may end in an error is executed alone repeatedly. In case of a fault, therefore, the detailed information can be collected.

Further, according to an exemplary embodiment, in the case where a predetermined load test program ends in an error, the plural load test programs are sequentially executed. In case of a fault, therefore, the detailed information can be collected.

Furthermore, according to an exemplary embodiment, in the case where a predetermined load test program ends in an error, the execution of the disturbance test program is suspended, and the load test programs may be executed again in parallel. In case of a fault, therefore, it is possible to know whether the particular fault is caused by a disturbance or not. Also, the detailed information collection is made possible with the particular knowledge.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A load test method for testing a computer having a plurality of various hardware resources by using load test programs, comprising:
    acquiring control information corresponding to each load test program, that includes information indicating the type of the hardware resources required for executing each load test program and quantitative conditions determined for each type of the hardware resources indicating a number or a quantity of hardware resource required for executing each load test program;
    acquiring an assignment rule table specifying a set of rules for each type of the hardware resources, each rule defining a rule for assigning corresponding hardware resource of the computer to the load test program to be executed;
    selecting a rule for each of the hardware resources from the set of rules specified in the acquired assignment rule table in such a manner that a load is imposed on a predetermined part of the computer;
    developing load test programs by assigning the hardware resources of the computer to each load test program based on the acquired control information and the selected rule for each of the hardware resources, assigning different hardware resources to each different load test program, and assigning a number of hardware resources indicated in the quantitative conditions included in the acquired control information to each of the load test programs;
    executing in parallel the developed load test programs;
    developing a disturbance test program by assigning the remaining hardware resources not assigned to the developed load test program to the disturbance test program, wherein the developed load test program group and the developed disturbance test program are executed in parallel to each other when executing the load test program group in parallel.

2. The load test method according to claim 1, further comprising:
    reading a set of rules selected from the assignment rule table in such a manner as to impose a load on a part intended for the load test of the computer,
    wherein the developing of the load test program includes developing the load test programs by assigning the hardware resources of the computer to each load test program based on the acquired control information and each of the acquired rule sets.

3. The load test method according to claim 1, further comprising
    reexecuting only a load test program that has ended in an error among the load test programs executed in parallel, if any of the test program has ended in an error.

4. The load test method according to claim 1, further comprising
    sequentially reexecuting each of the load test programs executed in parallel in the case where any load test program among the load test programs executed in parallel ends in an error.

5. The load test method according to claim 1, further comprising
    suspending an execution of the disturbance test program and reexecuting the load test programs in parallel, when any of the load test programs has ended in error.

6. A load test apparatus, comprising an information processing system having a plurality of hardware resources, comprising:
    a control information reading unit that reads control information indicating a correspondence between a type of the hardware resources required for executing a load test program and quantitative conditions determined for each type of the hardware resources indicating condition relating to a number or quantity of each hardware resource required for execution of the load test program;
    an assignment rule table reading unit that reads an assignment rule table indicating a set of rules defined for each of the hardware resources to assign the hardware resources of the information processing system to the load test program;
    a rule selecting unit that selects a rule for each of the hardware resources from the assignment rule table read by the assignment rule table reading unit in such a manner as to impose a load on a predetermined part of the information processing system;
    a load test program development unit that develops load test programs by assigning the hardware resources to each of the load test program based on the control information read by the control information reading unit and the rule for each of the hardware resources selected by the rule selecting unit, different hardware resources being assigned to each different load test program, and a number of hardware resources indicated in the quantitative conditions included in the acquired control information being assigned to each of the load test programs; and
    a load test program execution unit that executes, in parallel, the load test programs developed by the load test program development unit,
    wherein the load test program development unit includes a disturbance test program development unit that develops a disturbance test program by assigning the hardware resources remaining without being assigned to the developed load test program to the disturbance test program to be developed, and
    the load test program execution unit executes in parallel the load test programs developed by the load test program development unit and the disturbance test program developed by the disturbance test program development unit.

7. The load test apparatus according to claim 6, further comprising:
a rule set reading unit that reads a set of rules selected from the assignment rule table in such a manner as to impose a load on an intended part of the information processing system for the load test,
wherein the load test programs are developed in the load test program development unit by assigning the hardware resources to each of the load test programs based on the control information read by the control information reading unit and each set of the rules read by the rule set reading unit.

8. The load test apparatus according to claim 6,
wherein the load test program execution unit reexecutes only the load test program that ended in an error among the executed load test programs when any of the load test programs has ended in error.

9. The load test apparatus according to claim 6,
wherein the load test program execution unit sequentially executes all of the executed load test programs in the case where any of the load test programs has ended in an error.

10. The load test apparatus according to claim 6,
wherein the load test program execution unit suspends the execution of the disturbance test program and reexecutes the load test programs in parallel to each other, when any of the load test programs ends in an error.

11. A load test apparatus for testing an information processing system having a plurality of hardware resources by using a load test program having plural small scale test programs, a smaller number of hardware resources among the hardware resources of the information processing system is assigned to each small scale test program, the load test apparatus comprising:
control information reading means for reading control information corresponding to each small scale test program, the control information includes information indicating type of the hardware resources required for executing corresponding small scale test program, and quantitative conditions determined for each type of the hardware resources indicating a number of quantity of each type of the hardware resource required for executing corresponding small scale test program;
assignment rule table reading means for reading an assignment rule table indicating a set of rules corresponding to each type of the hardware resources, each rule defines a rule for assigning the hardware resources of the information processing system to each small scale test program;
rule select means for selecting a rule for each of the hardware resources read from the assignment rule table in such a manner as to impose a load on a predetermined part of the information processing system;
load test program development means for developing the small scale load test programs by assigning the hardware resources of the computer to each small scale test program based on the control information read by the control information reading means and the selected rule for each of the hardware resources, assigning different hardware resources to each different load test program, and assigning a number of hardware resources indicated in the quantitative conditions included in the acquired control information to each of the load test programs; and execution means for executing the developed small scale test programs and developing a disturbance test program by assigning the remaining hardware resources not assigned to the developed small scale test program to the disturbance test program,
wherein the developed small scale test program and the developed disturbance test program are executed in parallel to each other when executing the load test program group in parallel.

12. A load test apparatus for testing an information processing system having various hardware resources by using small scale test programs in which a smaller number of hardware resources among the hardware resources of the information processing system is assigned to, the load test apparatus comprising:
a storage unit that stores:
control information corresponding to each small scale test program, indicating a correspondence between type information of a type of the hardware resource required to execute the corresponding small test program and a quantitative condition indicating a number or a quantity of the corresponding type of the hardware resource required to execute the small scale test program, and
an assignment rule table that indicates a set of assignment rules each corresponds to each type of the hardware resources, each assignment rule indicates a rule for assigning the corresponding hardware resource to a small scale test program; and
a controller that operates as:
a control information reading means for reading the control information corresponding to a small scale test program to be executed;
an assignment rule table reading means for reading the assignment rule table corresponding to the type of hardware resource that is required to execute a small scale test program:
an assignment means for assigning hardware resource to the small scale test program to be executed based on the control information corresponds to the small scale test program to be executed, and an assignment rule selected from the set of rules corresponding to the type of hardware resource required to execute the small scale test program, assigning different hardware resources to each different load test program, and assigning a number of hardware resources indicated in the quantitative conditions included in the acquired control information to each of the load test programs; and
an execution means for executing in parallel the small scale test programs in which a disturbance test program is developed by assigning the remaining hardware resources not assigned to the developed small scale test program to the disturbance test program,
wherein the developed small scale test program and the developed disturbance test program are executed in parallel to each other when executing the load test program in parallel.

13. The load test apparatus according to claim 12, wherein when any hardware resource is remaining after assigning hardware resource to any small scale test program, the assignment controller assigns hardware resource among the remaining hardware resource to the other small scale test program.

* * * * *